(12) United States Patent
Shirono

(10) Patent No.: US 7,973,855 B2
(45) Date of Patent: Jul. 5, 2011

(54) IMAGE SHAKE CORRECTION APPARATUS AND METHOD

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 11/789,730

(22) Filed: Apr. 25, 2007

(65) Prior Publication Data

US 2007/0257989 A1 Nov. 8, 2007

(30) Foreign Application Priority Data

May 2, 2006 (JP) ................................. 2006-128621

(51) Int. Cl.
*H04N 5/225* (2006.01)
*H04N 5/228* (2006.01)

(52) U.S. Cl. .................................... 348/374; 348/208.7

(58) Field of Classification Search ............. 348/208.99, 348/208.4, 208.7, 374; 396/54, 55
See application file for complete search history.

(56) References Cited

U.S. PATENT DOCUMENTS

| | | | | |
|---|---|---|---|---|
| 7,453,494 B2 * | 11/2008 | Uenaka | ....................... | 348/208.7 |
| 7,477,291 B2 * | 1/2009 | Seo | ............................ | 348/208.7 |
| 7,529,476 B2 * | 5/2009 | Kurosawa | ....................... | 396/55 |
| 2003/0067544 A1 * | 4/2003 | Wada | ........................... | 348/208.7 |
| 2006/0056829 A1 * | 3/2006 | Hirota et al. | .................... | 396/54 |

FOREIGN PATENT DOCUMENTS

| | | |
|---|---|---|
| JP | 03-186823 A | 8/1991 |
| JP | 2001-147458 A | 5/2001 |
| JP | 2003-110919 A | 4/2003 |
| JP | 2003-111449 A | 4/2003 |
| JP | 2005-217993 A | 8/2005 |

* cited by examiner

*Primary Examiner* — Nicholas G Giles
(74) *Attorney, Agent, or Firm* — Drinker Biddle & Reath LLP

(57) ABSTRACT

An image shake correction apparatus and method for reducing frictional loss when elements vibrate or slide by reducing a distance from a center of an image pickup device stage to a virtual line connecting a portion, to which a driving force generator applies a driving force, and a guide portion. A CCD image sensor converts light irradiated on a photographing surface into electric signals, a slider and a CCD base support the CCD image sensor and move the CCD image sensor with respect to the photographing surface, and piezoelectric actuator assemblies drive the slider and the CCD base, such that the virtual line connects a portion, to which the driving force of the driving force generator is applied, to the guide portion that extends along the photographing surface of the CCD image sensor.

22 Claims, 19 Drawing Sheets

IMAGE SHAKE CORRECTION APPARATUS AND METHOD

CROSS-REFERENCE TO RELATED PATENT APPLICATIONS

This application claims the benefit of Japanese Patent Application No. 2006-128621, filed on May 2, 2006, in the Japan Intellectual Property Office, the disclosure of which is incorporated herein in its entirety by reference.

BACKGROUND OF THE INVENTION

1. Field of the Invention

The present invention relates to an image shake correction apparatus and method for use in a camera. More particularly, the present invention relates to an image shake correction apparatus and method that reduces frictional loss in a camera caused by vibration or shaking.

2. Description of the Related Art

Related image shake correction apparatuses are provided in photographing apparatuses to correct for shaking images when taking a picture. The image shake correction apparatus is installed on a main body of the photographing apparatus so that an image pickup device, on which an image is focused, can be moved in two perpendicular directions in a single plane. The image shake correction apparatus detects vibrations of the photographing apparatus, and changes a position of the image pickup device according to the detected values in order to prevent shaking the image focused by the image pickup device.

Referring to FIG. 1, a related image shake correction apparatus generally includes a first image pickup device stage 90, on which an image pickup device assembly 10 including an image pickup device is mounted, a second image pickup device stage 20 coupled to the first image pickup device stage 90, and actuators 40 and 42 moving the first and second image pickup stages 90 and 20, respectively. The image shake correction apparatus is installed on a base plate 80. The first and second image pickup device stages 90 and 20 are respectively connected to shafts 94 and 24 through connection portions 92 and 22, respectively, and guided in a predetermined direction. The first and second image pickup device stages 90 and 20 move parallel to the axial directions of the shafts 94 and 24. When signals for correcting image shake are input to the actuators 40 and 42, the actuators 40 and 42 move the first and second image pickup device stages 90 and 20 in a direction of correcting the image shake.

Referring to FIG. 2, another related image shake correction apparatus includes coils 45 and 48 and magnets 44 and 46 as actuators that operate first and second image pickup device stages 90 and 20. In the image shake correction apparatus of FIG. 2, the coils 45 and 48 are electrically connected with each other so that the first and second image pickup device stages 90 and 20 are driven by electromagnetic force generated with respect to the magnets 44 and 46. Thus, when power is turned off, the first and second image pickup device stages 90 and 20 move freely. In order to prevent the first and second image pickup device stages 90 and 20 from moving freely, the first and second image pickup device stages 90 and 20 require locking tools. A related device prevents an image pickup device stage from moving perpendicularly to a driving direction of an actuator by installing an insertion portion on an engaging portion of the actuator and the image pickup device stage. In addition, another related device provides an actuator that includes a voice coil actuator and a coil portion includes a yaw coil and a pitch coil.

Meanwhile, in the related image shake correction apparatus shown in FIG. 1, the shafts 24 and 94 guiding the image pickup device stages 20 and 90 are disposed on outer portions of the image pickup device stages 20 and 90. However, centers of the image pickup device stages 20 and 90 and center axes of the shafts 24 and 94 are separated from each other by distances $\Delta X$ and $\Delta Y$, and thus, when the image pickup device stages 20 and 90 move, torques occur because the image pickup device stages 20 and 90 rotate with respect to the center axes of the shafts 24 and 94. The torques become larger when the distances $\Delta X$ and $\Delta Y$ become longer.

Therefore, the torques generated due to the rotations of the image pickup device stages 20 and 90 act against the motion of the actuators 42 and 40 that move the image pickup device stages 20 and 90. In addition, a friction loss may occur when the image shake correction apparatus is driven, or the image pickup device may vibrate. Also, the shafts 24 and 94 guiding the image pickup device stages 20 and 90 are axial members having lengths in a predetermined direction, and thus, the shafts 24 and 94 must be disposed on the outer portions of the image pickup stages 20 and 90. Accordingly, the shafts 24 and 94 guiding the image pickup device stages 20 and 90 are still separated from the centers of the image pickup device stages 20 and 90.

SUMMARY OF THE INVENTION

An embodiment of the present invention provides an image shake correction apparatus including: an image pickup device changing a light irradiated on a photographing surface into electric signals; an image pickup device stage supporting the image pickup device, and moving the image pickup device on a surface parallel to the photographing surface; a driving force generator driving the image pickup device stage; and a guide portion guiding a moving direction of the image pickup device stage, wherein a virtual line connecting a portion, to which the driving force generator can apply a driving force to the guide portion extends on the photographing surface of the image pickup device.

According to an aspect of an embodiment of the invention, the image pickup device converts the light irradiated on the photographing surface into an electric signal, the image pickup device stage maintains the photographing device and moves the image pickup device on a surface parallel to the photographing surface, the driving force generator drives the image pickup device stage, and the guide portion guides a moving direction of the image pickup device stage. In addition, the virtual line connecting a portion, to which the driving force generator can apply a driving force to the guide portion extends on the photographing surface of the image pickup device.

The image shake correction apparatus may further include: an elastic bias portion that elastically biases the driving force generator so as to press the driving force generator to make contact with an operating portion of the image pickup device stage. Therefore, the driving force of the driving force generator may be transferred to the operating portion of the image pickup device stage using a frictional force so as to move the image pickup device stage on a surface parallel to the photographing surface.

The driving force generator may be disposed so that a length of the driving force generator is substantially perpendicular to the moving direction of the image pickup device stage and parallel to the photographing surface of the image pickup device.

The image shake correction apparatus may further include: a fixing member fixed on a main body of the apparatus and to which the elastic biasing force is applied from the elastic bias portion through the operating portion of the image pickup device stage; and a first ball bearing inserted between the fixing member and the image pickup device stage. In addition, grooves having V-shaped cross sections may be formed in opposing surfaces of the fixing member and the image pickup device stage, respectively, such that the grooves face each other and the first ball bearing is interposed between the grooves.

A pair of driving force generators may be disposed on both sides of the image pickup device so as to drive the image pickup device in the moving direction. A second ball bearing may be interposed between base plate fixed on the main body of the apparatus and the image pickup device stage. The stage maintaining portion may maintain steady the image pickup device stage so as to move the image pickup device stage on a surface parallel to the photographing surface. A virtual triangle formed by connecting the operating portions of the pair of driving force generators and the second ball bearing may be disposed over at least a part of the photographing surface.

The image pickup device stage may include a first stage moving the image pickup device in a first direction, and a second stage moving the image pickup device in a second direction that is perpendicular to the first direction.

The driving force generator may include a first driving force generator driving the first stage in the first direction, and a second driving force generator integrally mounted with the first stage for moving the second stage in the second direction.

The first driving force generator and the second driving force generator may be disposed in the same quadrant when it is assumed that the moving direction of the first stage and the moving direction of the second stage are axes of coordinates that are perpendicular to each other on the photographing surface of the image pickup device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
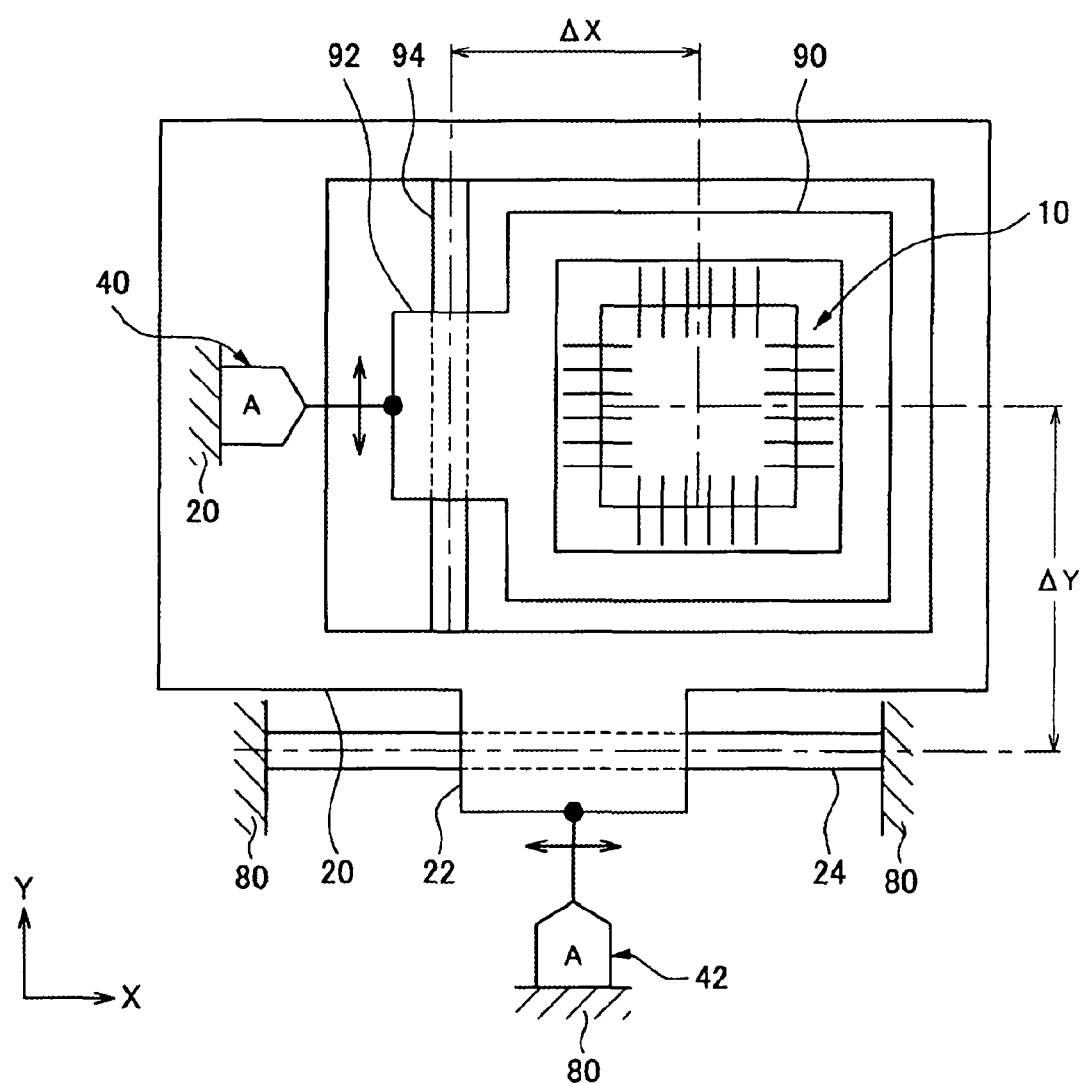
FIG. 1 is a plan view of a related image shake correction apparatus.
Figure 2:
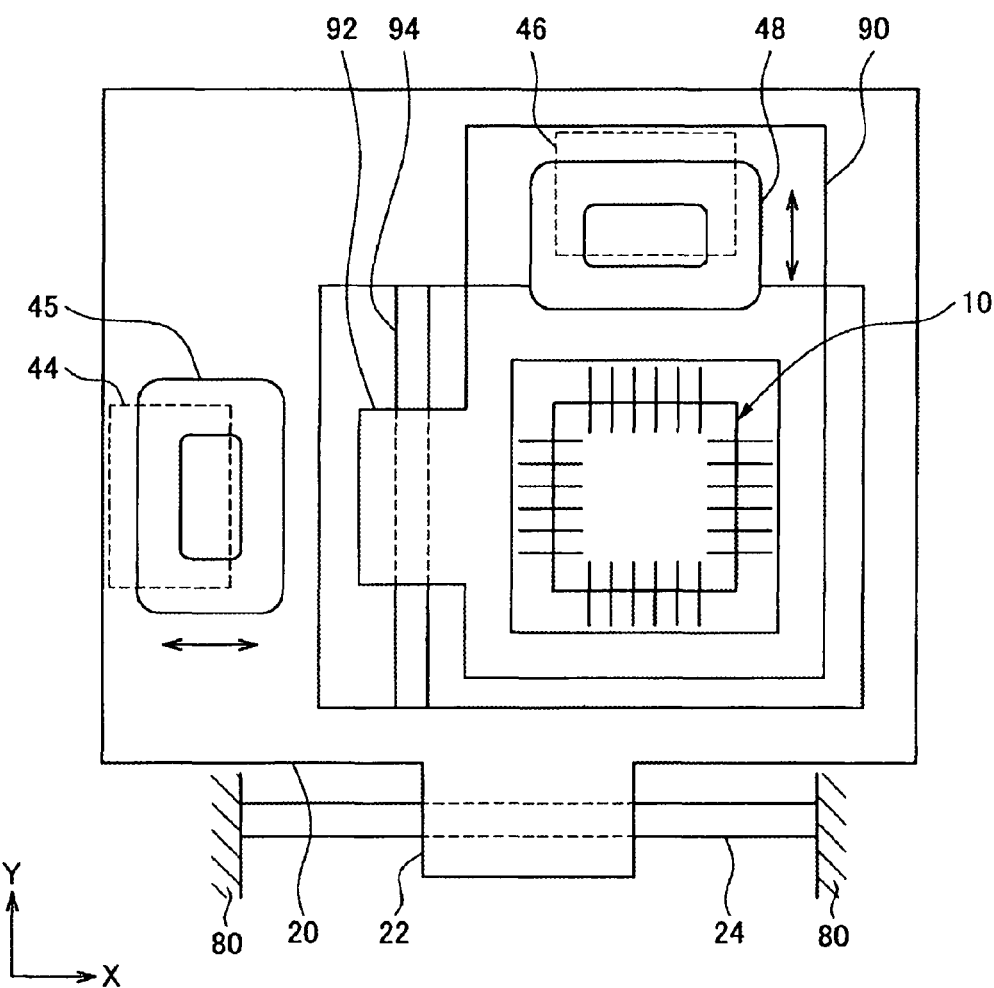
FIG. 2 is a plan view of another related image shake correction apparatus.

Embodiments of the present invention will now be described more fully with reference to the accompanying drawings, in which exemplary embodiments of the invention are shown. Like reference numerals in the drawings denote like elements.

An image shake correction apparatus 100 according to an embodiment of the present invention is disposed in a photographing apparatus such as a camera. A charge-coupled device (CCD) image sensor 112 can be moved in dual-axial directions on a CCD base 190 and a slider 120. The image shake correction apparatus 100 detects vibrations of the photographing apparatus, and changes a position of the CCD image sensor 112 according to a detected value to prevent the images focused on the CCD image sensor 112 from shaking.

Figure 3:
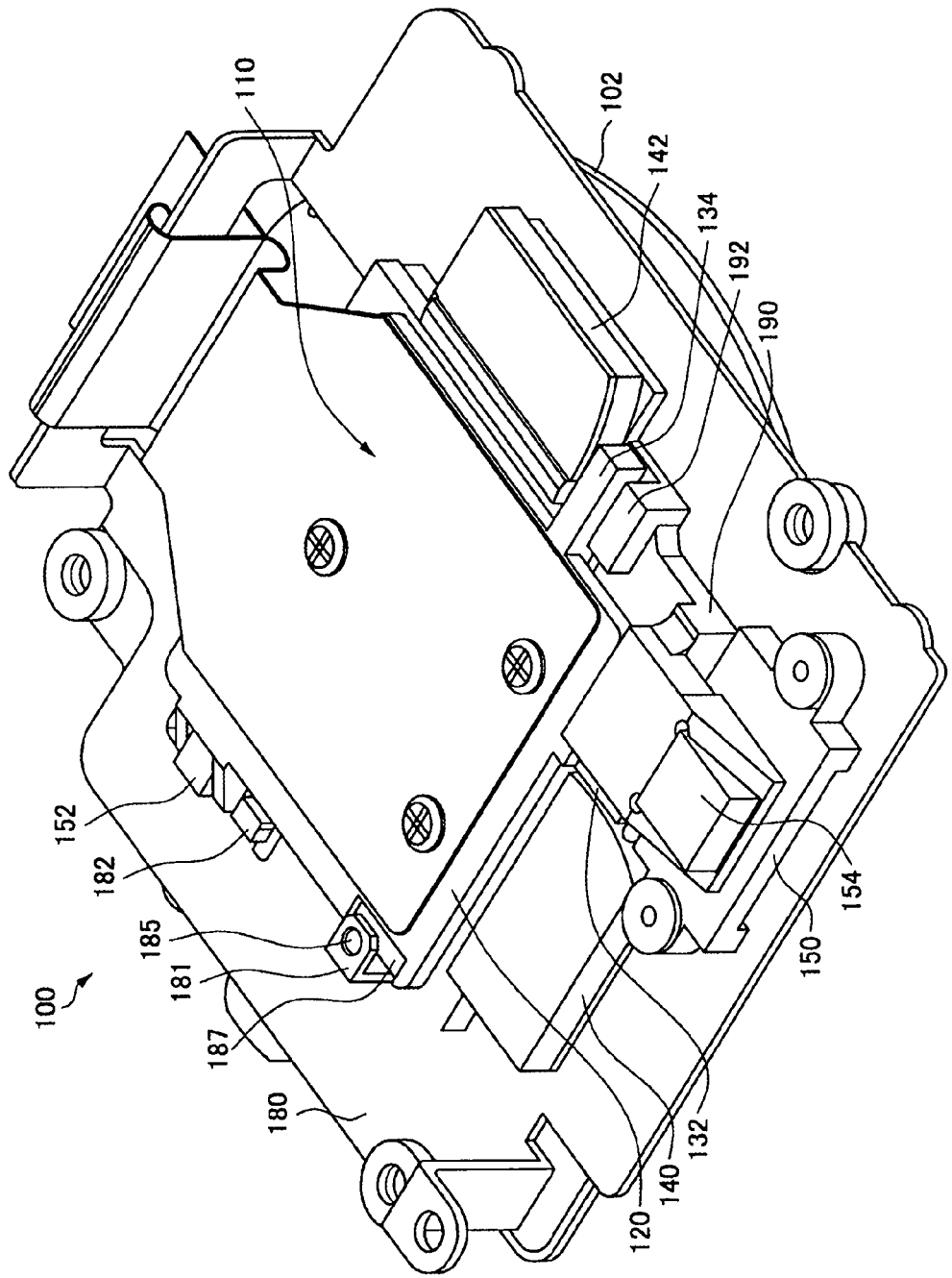
FIG. 3 is a perspective view of an image shake correction apparatus according to an embodiment of the present invention.
Figure 4:
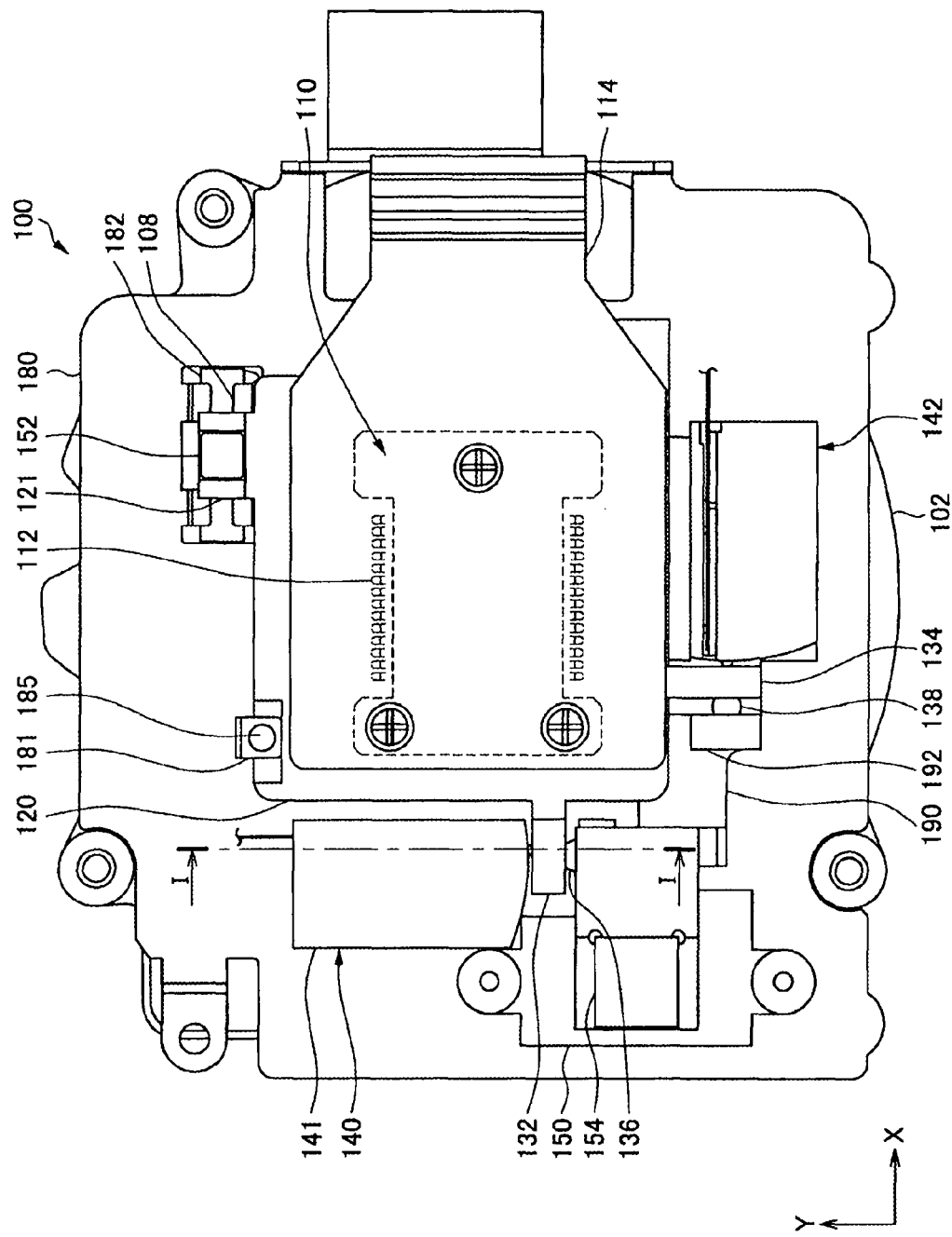
FIG. 4 is a plan view of the image shake correction apparatus of FIG. 3.
Figure 5:
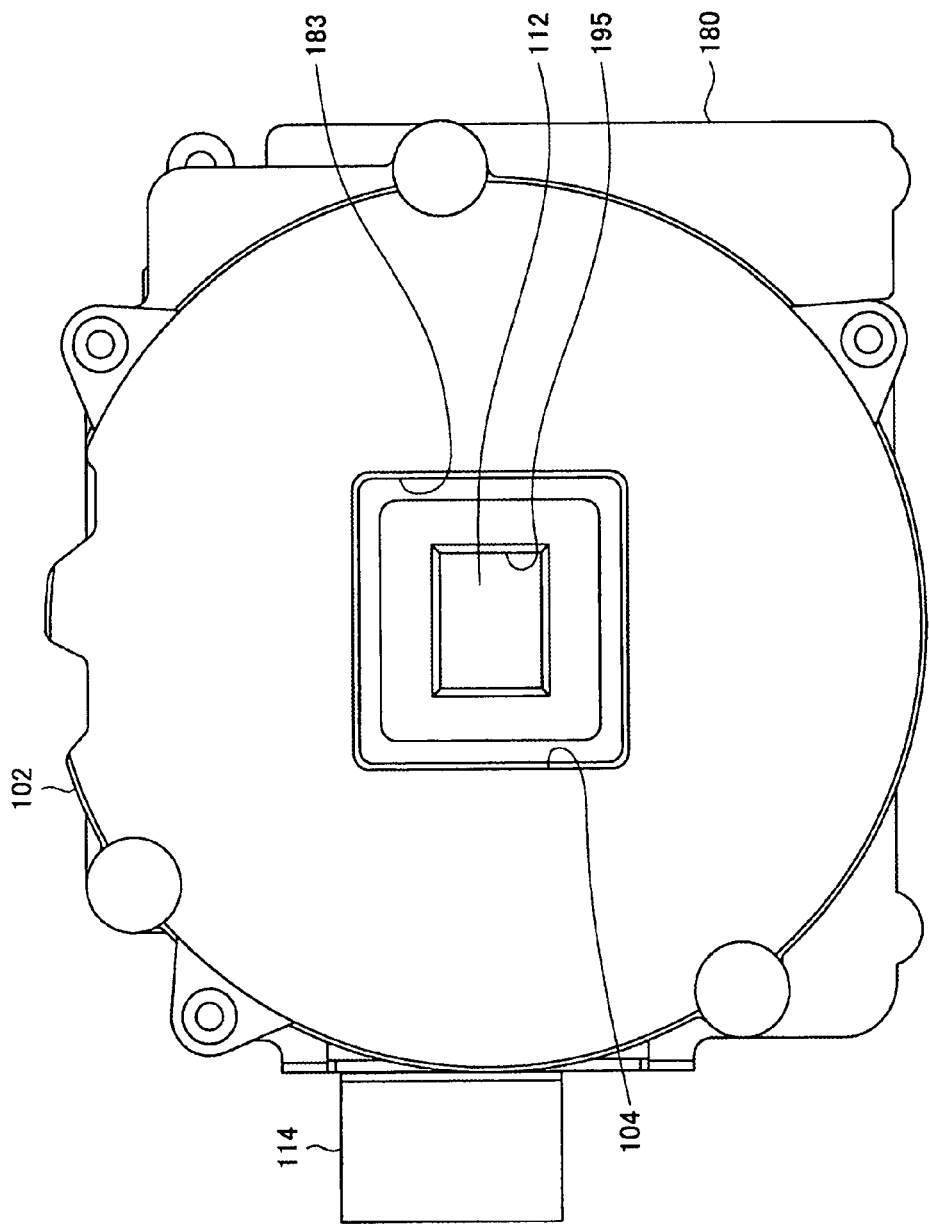
FIG. 5 is a plan view of the image shake correction apparatus of FIG. 3, as seen from the opposite side of the apparatus shown in FIG. 4.
Figure 6:
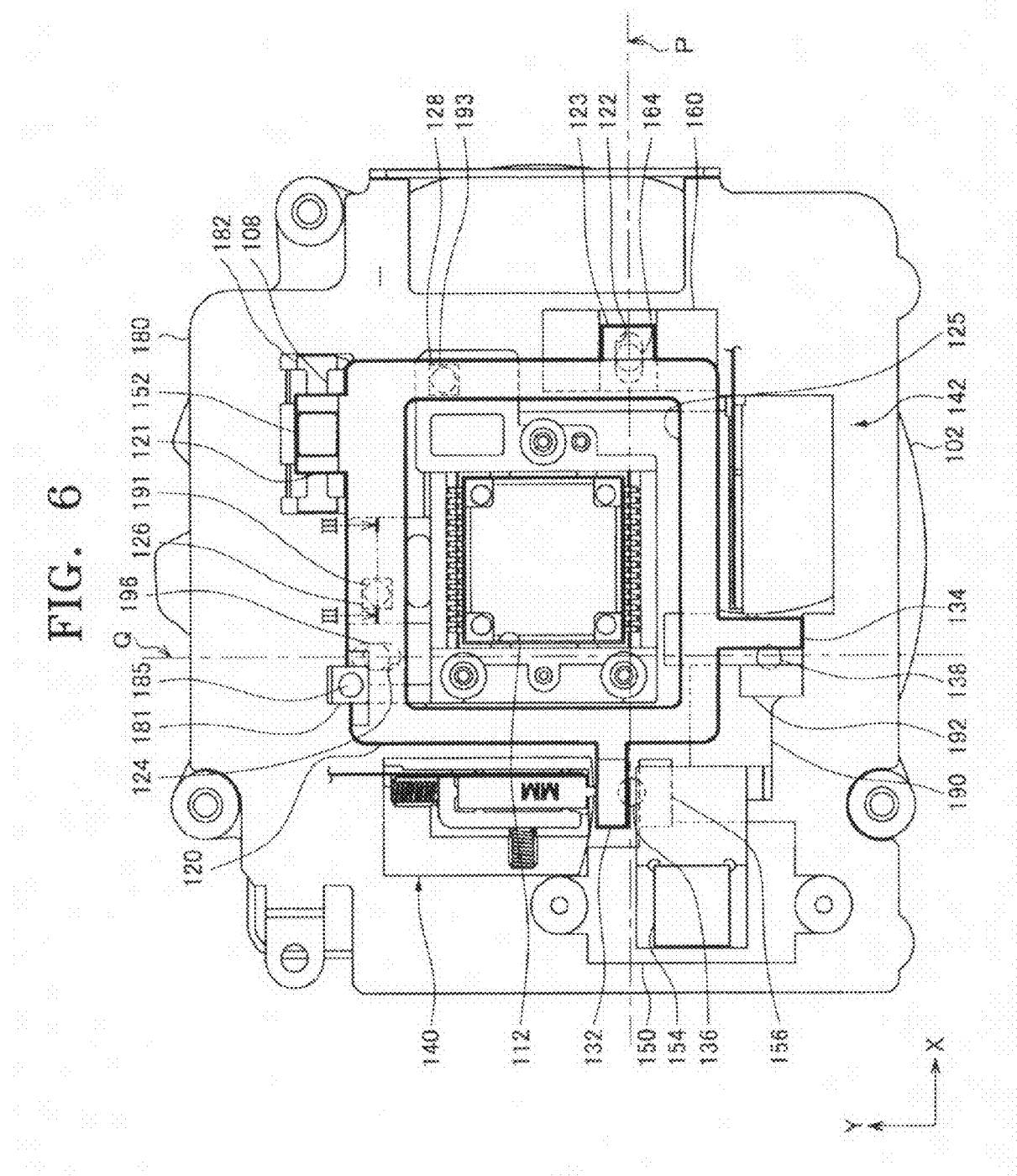
FIG. 6 is a plan view of the image shake correction apparatus of FIG. 3 in a state where a flexible printed circuit (FPC) and an image pickup device cover plate are separated from the apparatus of FIG. 4.
Figure 7:
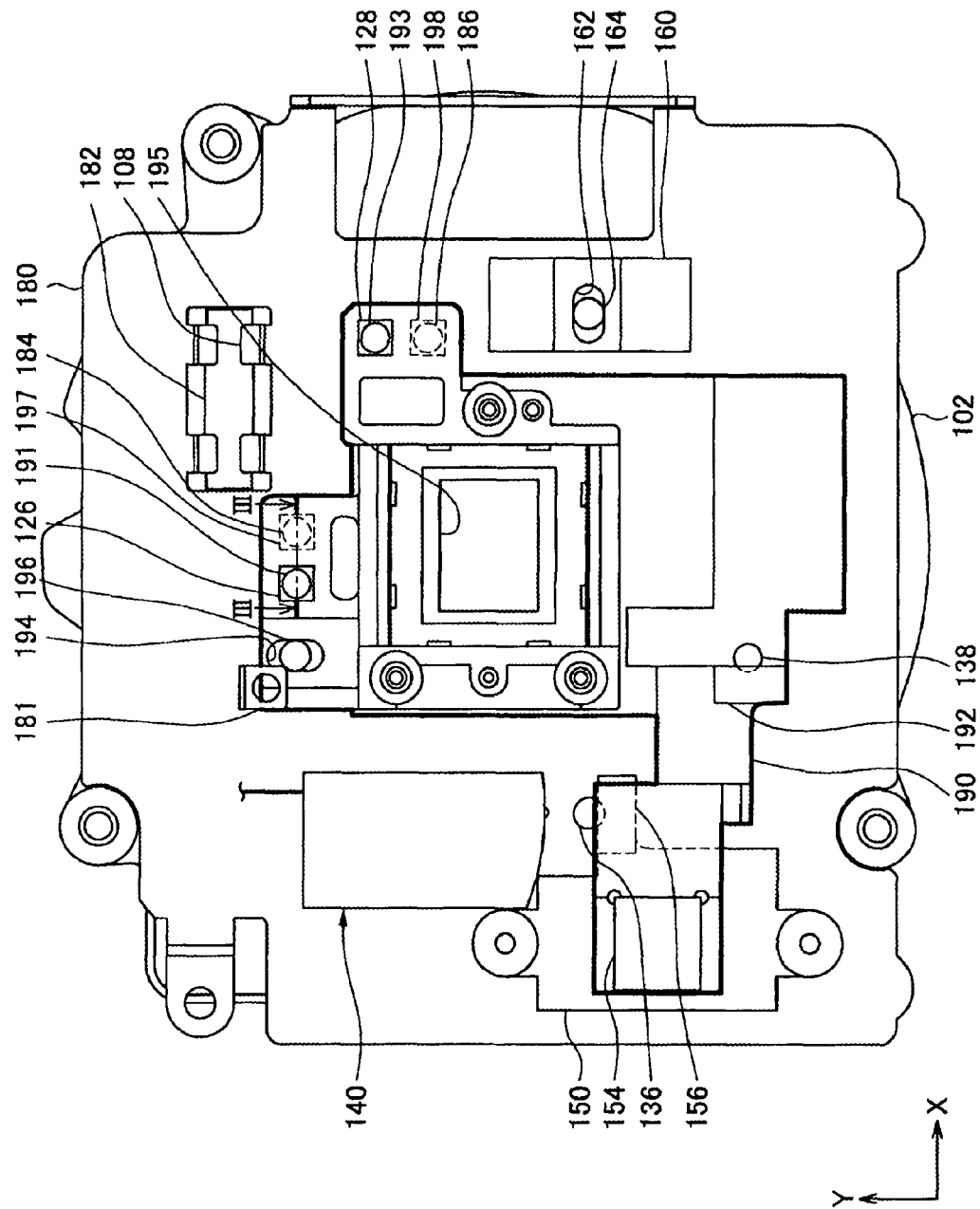
FIG. 7 is a plan view of the image shake correction apparatus of FIG. 3 in a state where a slider and a piezoelectric actuator assembly are separated from the apparatus of FIG. 6.
Figure 8:
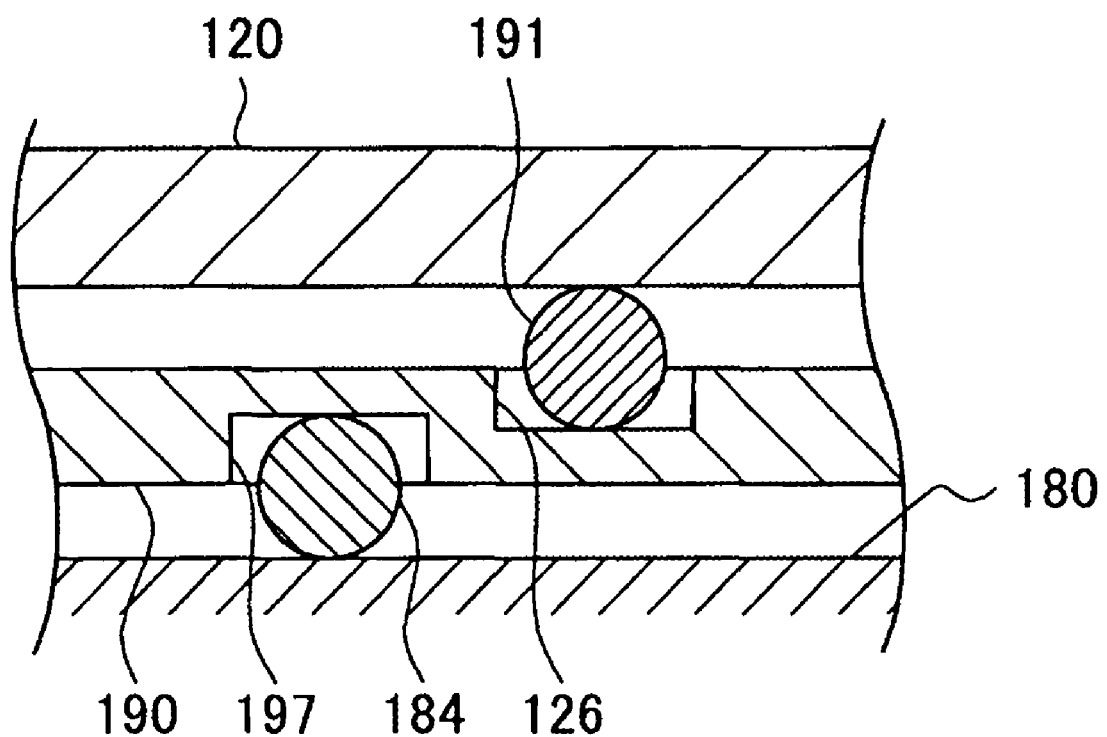
FIG. 8 is a cross-sectional view of the image shake correction apparatus taken along line III-III of FIGS. 6 and 7.

Referring to FIGS. 3 through 8, a structure of the image shake correction apparatus 100 will be described. FIG. 3 is a perspective view of the image shake correction apparatus 100 according to an exemplary embodiment of the present invention, FIG. 4 is a plan view of the image shake correction apparatus 100 according to the exemplary embodiment, and FIG. 5 is a plan view of the image shake correction apparatus 100 according to the exemplary embodiment as viewed from the opposite side. FIG. 6 is a plan view of the image shake correction apparatus 100 in a state where a flexible printed cable (FPC) 114 and an image pickup device cover plate are separated therefrom. FIG. 7 is a plan view of the image shake correction apparatus 100 of FIG. 6 in a state where the slider 120 and a piezoelectric actuator assembly 142 are further separated, and FIG. 8 is a cross-sectional view of the image shake correction apparatus 100 taken along line III-III of FIGS. 6 and 7.

The image shake correction apparatus 100 includes a base plate 180 coupled to a lens plate 102, a CCD base 190 disposed on the base plate 180, and a slider 120 disposed on the CCD base 190. An image pickup device, for example, the CCD image sensor 112, is mounted on the CCD base 190. Referring to FIGS. 6 and 7, the slider 120 can be moved in the X-axis direction with respect to the base plate 180. In addition, the CCD base 190 can be moved in the Y-axis direction with respect to the slider 120.

As shown in FIG. 5, the lens plate 102 is coupled to the base plate 180, and CCD image sensor 112 as the image pickup device is mounted on the lens plate 102 such that the CCD image sensor 112 faces a series of lenses of the photographing apparatus. The lens plate 102 is a circular flat plate, and includes an opening 104 exposing the CCD image sensor 112 because the light incident through the lens reaches the CCD image sensor 112 through the opening 104.

As shown in FIGS. 4, 6, and 7, the base plate 180 is a rectangular flat plate, and a surface of the base plate 180 is coupled to the lens plate 102. On the other surface of the base plate 180, the CCD base 190, a sensor holder 150, a ball holder 160, the piezoelectric actuator assembly 140 (driving force generator), and a metal plate 182 are disposed as shown in FIG. 7. Referring to FIG. 5, the base plate 180 includes an opening 183 exposing the CCD image sensor 112 like the opening 104 of the lens plate 102.

Referring to FIG. 7, the CCD base 190 includes an opening 195 exposing the CCD image sensor 112. In addition, as shown in FIGS. 7 and 8, rectangular concave portions 197 and 198 are formed on a surface of the CCD base 190 facing the base plate 180, and ball bearings 184 and 186 having diameters shorter than lengths of the side of the concave portions 197 and 198 are disposed in the concave portions 197 and 198. The CCD base 190 can be moved on the base plate 180 via the ball bearings 184 and 186.

In addition, as shown in FIGS. 6 through 8, rectangular concave portions 126 and 128 are formed on a surface of the CCD base 190 facing the slider 120, and ball bearings 191 and 193 are disposed in the concave portions 126 and 128. The CCD base 190 can be moved with respect to the slider 120 via the ball bearings 191 and 193. As shown in FIG. 6, the CCD image sensor 112, the slider 120, and the piezoelectric actuator assembly 142 (driving force generator) are mounted on the CCD base 190.

Referring to FIG. 6, the slider 120 is a square member including an opening 125. Protrusion portions 132 and 134, a magnet holder 121, and a ball holder guide 123 protrude from the outer portion of the slider 120. The slider 120 can be moved on the CCD base 190 via the ball bearings 191 and 193 installed on the lower surface of the slider 120.

Referring to FIGS. 4, 6, and 7, the piezoelectric actuator assemblies 140 and 142 are installed adjacent to the protrusion portions 132 and 134 of the slider 120, respectively. The piezoelectric actuator assembly 140 is disposed on the base plate 180 so that a length thereof is parallel with the Y-axis direction, and the piezoelectric actuator assembly 142 is disposed on the CCD base 190 so that the length thereof is parallel with the X-axis direction.

Hereinafter, the piezoelectric actuator assemblies 140 and 142 will be described in more detail. The piezoelectric actuator assemblies 140 and 142 are installed on opposite surfaces of the base plate 180 and have the same functions, and thus, only the piezoelectric actuator assembly 140 will be described.

Figure 9:
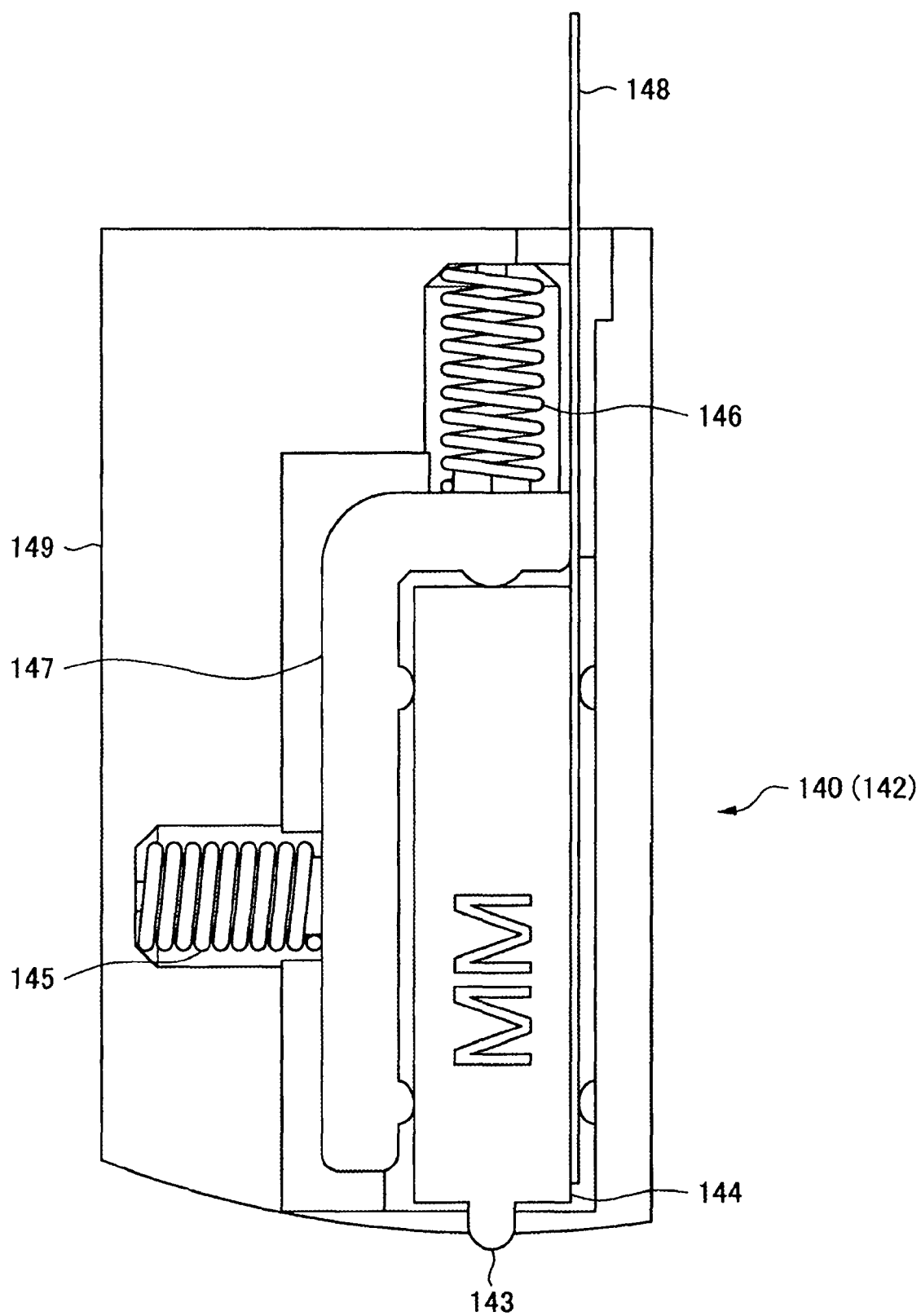
FIG. 9 is a plan view of the piezoelectric actuator assembly of FIG. 3.

FIG. 9 is a plan view of the piezoelectric actuator assembly 140 according to an exemplary embodiment. Referring to FIG. 9, the piezoelectric actuator assembly 140 includes a piezoelectric device 144, compression coil springs 145 and 146, an SP contact 147, and an FPC 148.

The piezoelectric device 144 of the piezoelectric actuator assembly 140 includes a sliding portion 143 contacting the protrusion portions 132 and 134 of the slider 120 on a front edge portion thereof, and an input portion (not shown), to which sine waves generated by modulating square waves using pulse width modulation (PWM) are input. In addition, the compression coil springs 145 and 146 bias the piezoelectric device 144 through the SP contact 147 elastically. The SP contact 147 is an L-shaped member contacting the piezoelectric device 144 and the compression coil springs 145 and 146. The FPC 148 connects the piezoelectric device 144 to a circuit (not shown) installed on the photographing apparatus. The FPC 148 is a circuit for applying a driving voltage to the piezoelectric device 144, wherein the driving voltage of the piezoelectric device 144 is supplied from a power source (not shown) installed on the photographing apparatus.

Figure 10:
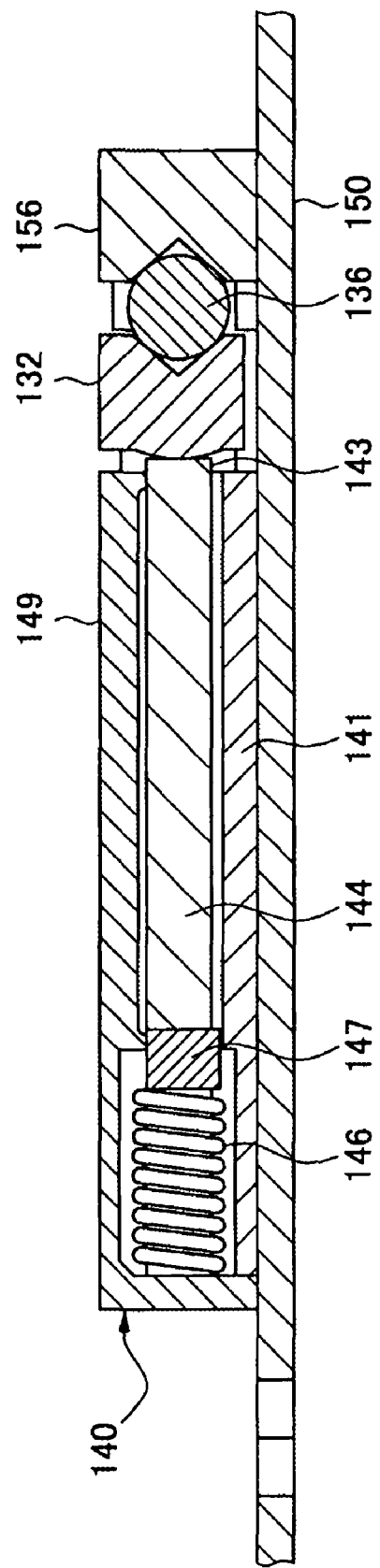
FIG. 10 is a cross-sectional view of the image shake correction apparatus taken along line I-I of FIG. 4.

FIG. 10 is a cross-sectional view of the piezoelectric actuator assembly 140 taken along line I-I of FIG. 4. As shown in FIG. 10, the piezoelectric actuator assembly 140 includes a cover portion 141 and a base portion 149. The piezoelectric device 144, the compression coil springs 145 and 146, and the SP contact 147 are disposed between the cover portion 141 and the base portion 149.

Figure 11:
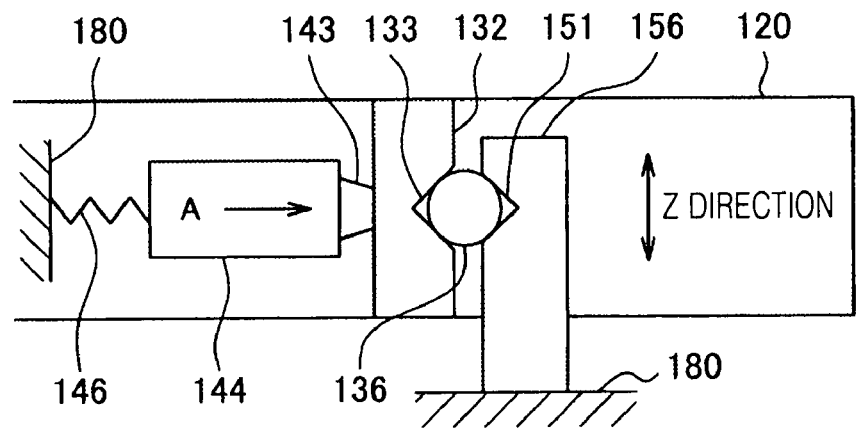
FIG. 11 is a schematic diagram illustrating the image shake correction apparatus of FIG. 10.

Referring to FIGS. 10 and 11, the piezoelectric actuator assembly 140, the protrusion portion 132 of the slider 120, and a support portion 156 of the sensor holder 150 will be described in detail. FIG. 11 is a schematic diagram of FIG. 10. A support portion 156 around the piezoelectric actuator assembly 140, which protrudes in a Z direction that is perpendicular to the X and Y-axis directions shown in FIG. 6, is formed on the sensor holder 150 fixed on the base plate 180.

As shown in FIG. 10, the support portion 156 is installed on an opposite side from the piezoelectric actuator assembly 140 with respect to the protrusion portion 132. The protrusion portion 132 and the support portion 156 respectively include groove portions 133 and 151 having V-shaped cross sections that extend in parallel with the X-axis direction of FIG. 6, and the groove portions 133 and 151 face each other. In addition, the ball bearing 136 is disposed between the groove portion 133 and the groove portion 151.

The piezoelectric device 144 is elastically biased to the right by the compression coil spring 146, and coupled, e.g., frictionally, to the protrusion portion 132. Accordingly, the protrusion portion 132 is also elastically biased to the right by the compression coil spring 146, and the ball bearing 136 is disposed between the protrusion portion 132 and the support portion 156.

When the sine waves generated by modulating the square waves using PWM are applied, the piezoelectric device 144 operates in an extension mode and a curvature mode. When the extension mode and the curvature mode are combined, the sliding portion 143 of the piezoelectric device 144 elliptically moves. The sliding portion 143 of the piezoelectric device 144 contacts the protrusion portions 132 and 134 of the slider 120 through the compression coil spring 146, and thus, the slider 120 moves in a direction (X-axis direction of FIG. 6) that is perpendicular to the length of the piezoelectric actuator assembly 140 by friction with the sliding portion 143.

When the piezoelectric actuator assembly 140 drives to move the slider 120 in the X-axis direction in FIG. 6, the ball bearing 136 disposed between the protrusion portion 132 and the support portion 156 rotates. Friction loss during moving of the slider 120 can be reduced by the rotation of the ball bearing 136. In addition, since the groove portions 133 and 151 of the protrusion portion 132 and the support portion 156 have the V-shaped cross sections and the ball bearing 136 is disposed between the groove portions 133 and 151, the slider 120 cannot move in the Z direction, as shown in FIG. 11. Therefore, shaking of the slider 120 in the Z direction can be prevented. In addition, the slider 120 is maintained steady in the Z direction by the ball bearings 191 and 193 and the ball bearing 136 disposed between the protrusion portion 132 of the slider 120 and the support portion 156 of the sensor holder 150.

Next, a structure for moving the CCD base 190 in the X-axis direction of FIG. 6 will be described. As shown in FIG. 6, the piezoelectric actuator assembly 140 is mounted on the CCD base 190. The support portion 156 that protrudes in a direction perpendicular to the XY-axis directions of FIG. 6 is disposed around the piezoelectric actuator assembly 140. The protrusion portion 132 of the slider 120 is disposed between the piezoelectric actuator assembly 140 on the CCD base 190 and the support portion 156 through the ball bearing 136. Here, referring to FIG. 10, the V-shaped groove portions extending in the X-axis direction are formed on opposing surfaces of the protrusion portion 132 and the support portion 156.

Therefore, when the slider 120 moves in the X-axis direction of FIG. 6, the CCD base 190 moves in the X-axis direction with the slider 120. That is, a driving source moving the slider 120 in the X-axis direction is the piezoelectric actuator assembly 140. Since the sliding portion 143 of the piezoelectric actuator assembly 140 contacts the protrusion portion 132 of the slider 120, the CCD base 190 and the slider 120 are moved in the X-axis direction. The protrusion portion 132 of the slider 120 is pressed toward the negative Y-axis direction by the piezoelectric actuator assembly 140, however, it is supported by the support portion 156 of the sensor holder 150 through the ball bearing 136, and thus, the protrusion portion 132 does not move in the negative Y-axis direction.

As described above, in the protrusion portion 132 of the slider 120, the ball bearing 136 is disposed between the piezoelectric actuator assembly 140 on the base plate 180 and the support portion 156 of the sensor holder 150. Therefore, even when the slider 120 is biased in the Y-axis direction by an external force, it does not move in the Y-axis direction.

Next, a structure for moving the CCD base 190 installed on the base plate 180 toward the Y-axis direction of FIG. 6 will be described. The CCD base 190 is not restricted to move in the Y-axis direction by other elements. Therefore, when the piezoelectric actuator assembly 142 disposed on the CCD base 190 is driven, the piezoelectric actuator assembly 142 contacting the protrusion portion 134 of the slider 120 moves in the Y-axis direction. In addition, since the piezoelectric actuator assembly 142 is fixed on the CCD base 190, when the piezoelectric actuator assembly 142 moves in the Y-axis direction, the CCD base 190 also moves in the Y-axis direction. The protrusion portion 134 of the slider 120 is pressed toward the negative X-axis direction of FIG. 6 by the piezoelectric actuator assembly 142, however, the protrusion portion 134 is supported by the support portion 192 disposed on the CCD base 190 with the ball bearing 138 interposed therebetween, and thus, the protrusion portion 134 does not move in the negative X-axis direction.

Next, the protrusion portion 134 of the slider 120 and the support portion 192 of the CCD base 190 will be described in detail. Like the protrusion portion 132 and the support portion 156 described with reference to FIGS. 10 and 11, groove portions (not shown) are formed on the protrusion portion 134 and the support portion 192 so that the ball bearing 138 can be disposed therebetween. The groove portions are formed on surfaces of the protrusion portion 134 and the support portion 192 facing each other, and have V-shaped cross sections extending in the Y-axis direction.

The protrusion portion 134 and the support portion 192 approach each other by being compressed by the piezoelectric actuator assembly 142 fixed on the CCD base 190 in the negative X-axis direction. Through this structure, when the piezoelectric actuator assembly 142 drives to move the CCD base 190 in the Y-axis direction in FIG. 6, the ball bearing 138 disposed between the protrusion portion 134 and the support portion 192 rotates. Due to the rotation of the ball bearing 138, friction loss occurring when the CCD base 190 is moving can be reduced. In addition, since the groove portions formed in the protrusion portion 134 and the support portion 192 have the V-shaped cross sections and the ball bearing 138 is disposed between the groove portions, the CCD base 190 cannot move in the Z direction in FIG. 11. Therefore, shaking of the CCD base 190 in the Z direction can be prevented. In addition, the CCD base 190 can be maintained steady in the Z direction by the ball bearings 184 and 186, and the ball bearing 138 disposed between the protrusion portion 134 of the slider 120 and the support portion 192 of the CCD base 190.

As described above, the slider 120 is driven in the X-axis direction with respect to the base plate 180 by the piezoelectric actuator assembly 140, and the CCD base 190 is driven in the Y-axis direction with respect to the slider 120 by the piezoelectric actuator assembly 142. Since the CCD image sensor 112 is fixed on the CCD base 190, the CCD image sensor 112 can be driven in the X and Y-axis directions.

Figure 12A:
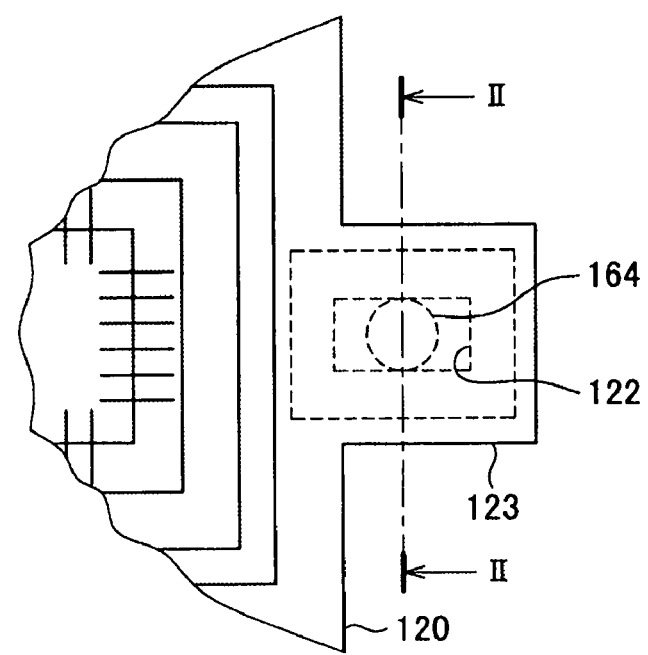
FIG. 12A is a plan view showing a region around a guide portion of the image shake correction apparatus of FIG. 3.
Figure 12B:
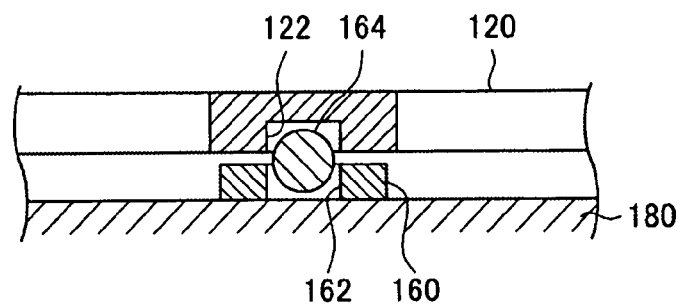
FIG. 12B is a cross-sectional view of the image shake correction apparatus taken along line II-II of FIG. 12A.

Next, referring to FIGS. 6, 7, 12A through 12C, a guide portion including a ball holder 160 and a ball holder guide 123 of the slider 120 will be described as follows. FIG. 12A is a plan view of a peripheral portion around the guide portion in the image shake correction apparatus according to an exemplary embodiment, FIG. 12B is a cross-sectional view of the image shake correction apparatus taken along line II-II of FIG. 12A, and FIG. 12C is a plan view of the guide portion in the image shake correction apparatus according to the exemplary embodiment.

The guide portion includes an elongated groove 162 (refer to FIG. 7) of the ball holder 160, an elongated groove 122 (refer to FIG. 6) of the ball holder guide 123, and a ball bearing 164. Referring to FIG. 7, the ball holder 160 is disposed on the base plate 180, and extends in the Y-axis direction. In addition, the elongated groove 162 extending in the X-axis direction is formed on a center portion of the ball holder 160. Meanwhile, as shown in FIGS. 6 and 12A, the ball holder guide 123 protrudes from the slider 120, and the elongated groove 122 extending in the X-axis direction is formed on the surface of the slider 120 facing the base plate 180. In addition, as shown in FIG. 12B, the ball bearing 164 is disposed between the two elongated grooves 162 and 122.

Figure 12C:
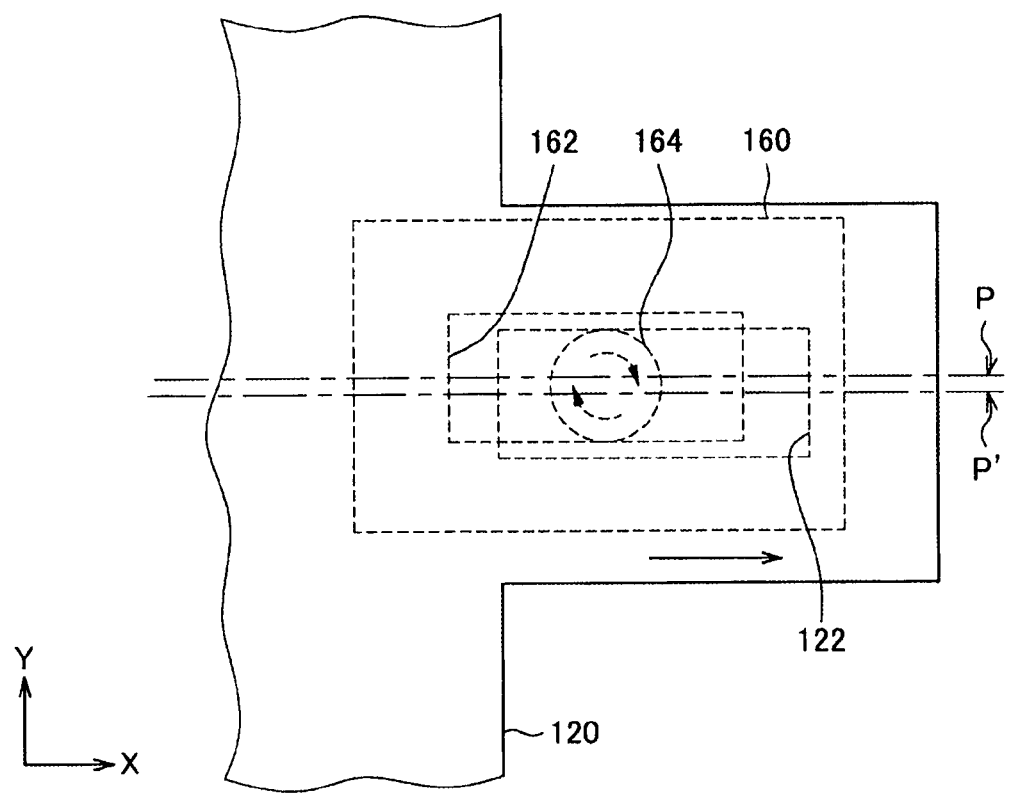
FIG. 12C is a plan view of the guide portion of the image shake correction apparatus of FIG. 3.

Therefore, when the slider 120 is moved in the X-axis direction of FIG. 12C by the piezoelectric actuator assembly 140, the slider 120 moves along a virtual guide line P connecting a portion, to which the driving force of the piezoelectric actuator assembly 140 is applied, to the guide portion. Meanwhile, as shown in FIG. 12C, widths of the elongated grooves 162 and 122 in the Y-axis direction are slightly longer than the diameter of the ball bearing 164. Therefore, the slider 120 can move in the X-axis direction, and can be moved as much as a difference between the width of the elongated grooves 162 and 122 and the diameter of the ball bearing 164 in the Y-axis direction. That is, the slider 120 can move along a virtual guide line P', as well as the guiding line P of FIG. 12C.

The slider 120 moves along the guiding line P' when the ball bearing 164 contacts inner surfaces of the elongated grooves 162 and 122. At this time, when the slider 120 moves in the Y-axis direction, as well as in the X-axis direction, the ball bearing 164 contacts the elongated grooves 162 and 122, and the ball bearing 164 rotates in a clockwise direction denoted by arrows in FIG. 12C. According to the above operation, the force generated when the slider 120 moves in the Y-axis direction can be changed into the driving force for moving the slider 120 in the X-axis direction. In addition, the diameter of the ball bearing 164 is shorter than a distance between bottom surfaces of the elongated grooves 162 and 122 which face each other. Therefore, the ball bearing 164 and the slider 120 do not contact each other in the Z direction that is perpendicular to the X and Y-axis directions, and the ball bearing 164 rotates only when the slider 120 moves in the X-axis direction or in the Y-axis direction.

Referring to FIGS. 6 and 7, the guide portion in the Y-axis direction will be described. The guiding portion includes an elongated groove 194 (refer to FIG. 7) formed on the CCD base 190, an elongated groove 124 (refer to FIG. 6) formed on the slider 120, and a ball bearing 196. As shown in FIG. 7, the elongated groove 194 extending in the Y-axis direction is formed on the surface of the CCD base 190 facing the slider 120. Meanwhile, the elongated groove 124 extending in the Y-axis direction of FIG. 6 is formed on the surface of the slider 120 facing the CCD base 190. In addition, the ball bearing 196 is disposed between the two elongated grooves 194 and 124. Therefore, when the CCD base 190 is driven in the Y-axis direction by the piezoelectric actuator assembly 142, the CCD base 190 basically moves on a virtual guide line Q connecting a portion, to which the driving force of the piezoelectric actuator assembly 142 is applied, to the guide portion along the elongated grooves 194 and 124.

In addition, the elongated grooves 194 and 124 and the ball bearing 196 have the same structures as those of the elongated grooves 162 and 122 and the ball bearing 164 shown in FIG. 12C, and have the same functions. That is, widths of the elongated grooves 194 and 124 in the X-axis direction are longer than a diameter of the ball bearing 196. Therefore, the CCD base 190 can move in the Y-axis direction, and also, the force generated when the CCD base 190 moves in the X-axis direction can be changed into a driving force for moving the CCD base 190 in the Y-axis direction by contacting the ball bearing 196 to inner side surfaces of the elongated grooves 194 and 124. In addition, the diameter of the ball bearing 196 is shorter than a distance between bottom surfaces of the elongated groove 194 and the elongated groove 124 facing each other, like the elongated grooves 162 and 122. In addition, the ball bearing 196 and the CCD base 190 or the slider 120 do not contact each other in a direction perpendicular to the X and Y-axis directions, and the ball bearing 196 rotates only when the CCD base 190 moves in the X-axis direction or in the Y-axis direction. As described above, the slider 120 and the CCD base 190 can move in the X and Y-axis directions along the guide lines P and Q.

Referring to FIG. 7, the sensor holder 150 and the magnet 154 installed on the CCD base 190 will be described as follows. The sensor holder 150 includes the support portion 156 that is perpendicular to the XY-axis directions of FIG. 7 as described above, and a position detection sensor (not shown; e.g., hall type) therein. The sensor holder 150 is disposed on the base plate 180. In addition, the magnet 154 is disposed on the CCD base 190 located on upper portion of the sensor holder 150. The position detection sensor is connected to a circuit installed on the photographing apparatus through an FPC (not shown). The moving position in the X and Y-axis directions is detected by the position detection sensor in the sensor holder 150, and the magnet 154, and thus, a servo-control is performed during a shake correcting process.

Figure 13:
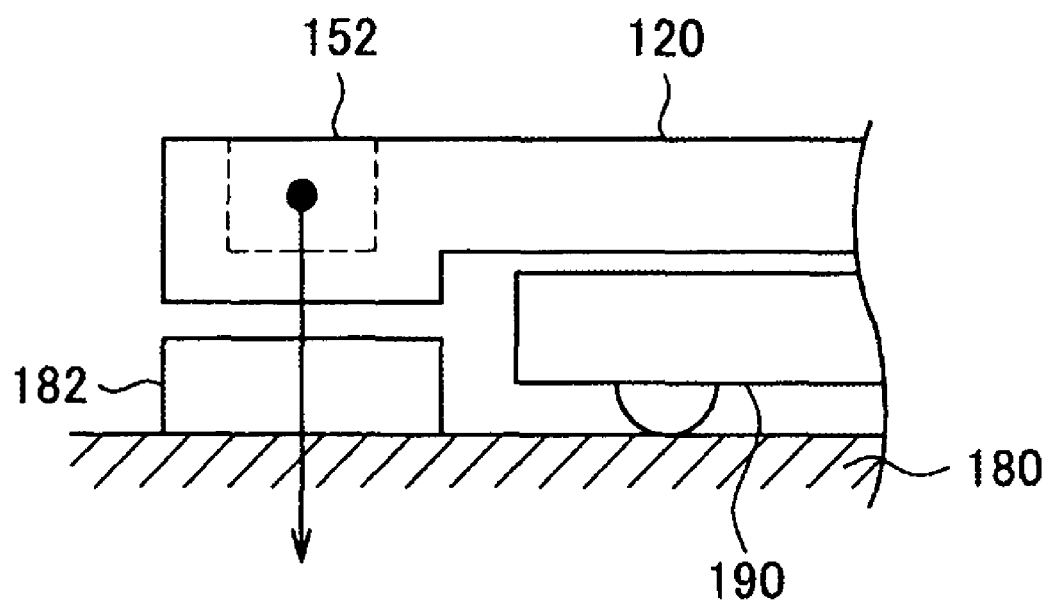
FIG. 13 is a side view of the image shake correction apparatus of FIG. 3.

Referring to FIGS. 6, 7, and 13, a metal plate 182 and a magnet 152 installed on the slider 120 will be described. FIG. 13 is side views of the image shake correction apparatus 100 according to an exemplary embodiment. As shown in FIG. 7, the metal plate 192 is a metal plate member extending in the X-axis direction, and is fixed on the base plate 180 using, e.g., a compressing material 108. In addition, as shown in FIG. 6, the magnet 152 is a rectangular plate-type magnet mounted on a magnet holder 121 of the slider 120. The magnet 152 and the magnet holder 121 are disposed on an upper portion of the metal plate 182. When the magnet 152 and the metal plate 182 are assembled with each other, the slider 120 is unlikely to be separated from the base plate 180.

In addition, even when the magnet 152 is moved by the slider 120 moving in the X-axis direction, the metal plate 182 extends in the X-axis direction, and thus, the metal plate 182 is always disposed under the magnet 152. Accordingly, a magnetic force is always applied in a direction (Z direction) perpendicular to the XY-axis directions as shown in FIGS. 13A and 13B. Meanwhile, unlike the exemplary embodiment, if the slider and the base plate are pulled by an elastic member, when the slider moves in the X-axis direction or the Y-axis direction, a tensile force is applied to the slider in the X and Y-axis directions, as well as in the Z direction. Thus, a force in the opposite direction of the driving force of the slider is generated by the elastic member. If the metal plate 182 and the magnet 152 of the exemplary embodiment are used, the above problem does not occur.

Referring to FIG. 3, a rising portion 181 and a ball bearing (not shown) as controlling units according to an exemplary embodiment will be described. As shown in FIG. 3, the rising portion 181 is disposed on the base plate 180. The rising portion 181 is disposed over a part of the slider 120. In addition, an engaging hole 185, in which the ball bearing is engaged, is disposed in the rising portion 181. The ball bearing is disposed between the concave portion 187 formed on the slider 120 and the engaging hole 185 of the rising portion 181.

The engaging hole 185 of the rising portion 181 and the concave portion 187 are separated a predetermined distance from each other so that the ball bearing does not contact both the rising portion 181 and the slider 120. Therefore, when the slider 120 is driven in the X-axis direction of FIG. 4, the ball bearing does not interfere with the movement of the slider 120. If an external shock is applied in the Z direction, which is perpendicular to the X and Y-axis direction, so that a force is applied in a direction opposite to the absorption force of the magnet 152 and the metal plate 182, movements of the slider 120 and the CCD base 190 in the Z direction can be prevented by the rising portion 181 and the ball bearing. Consequently, separation of the slider 120 and the CCD base 190 from the base plate 180 can be prevented.

Figure 14:
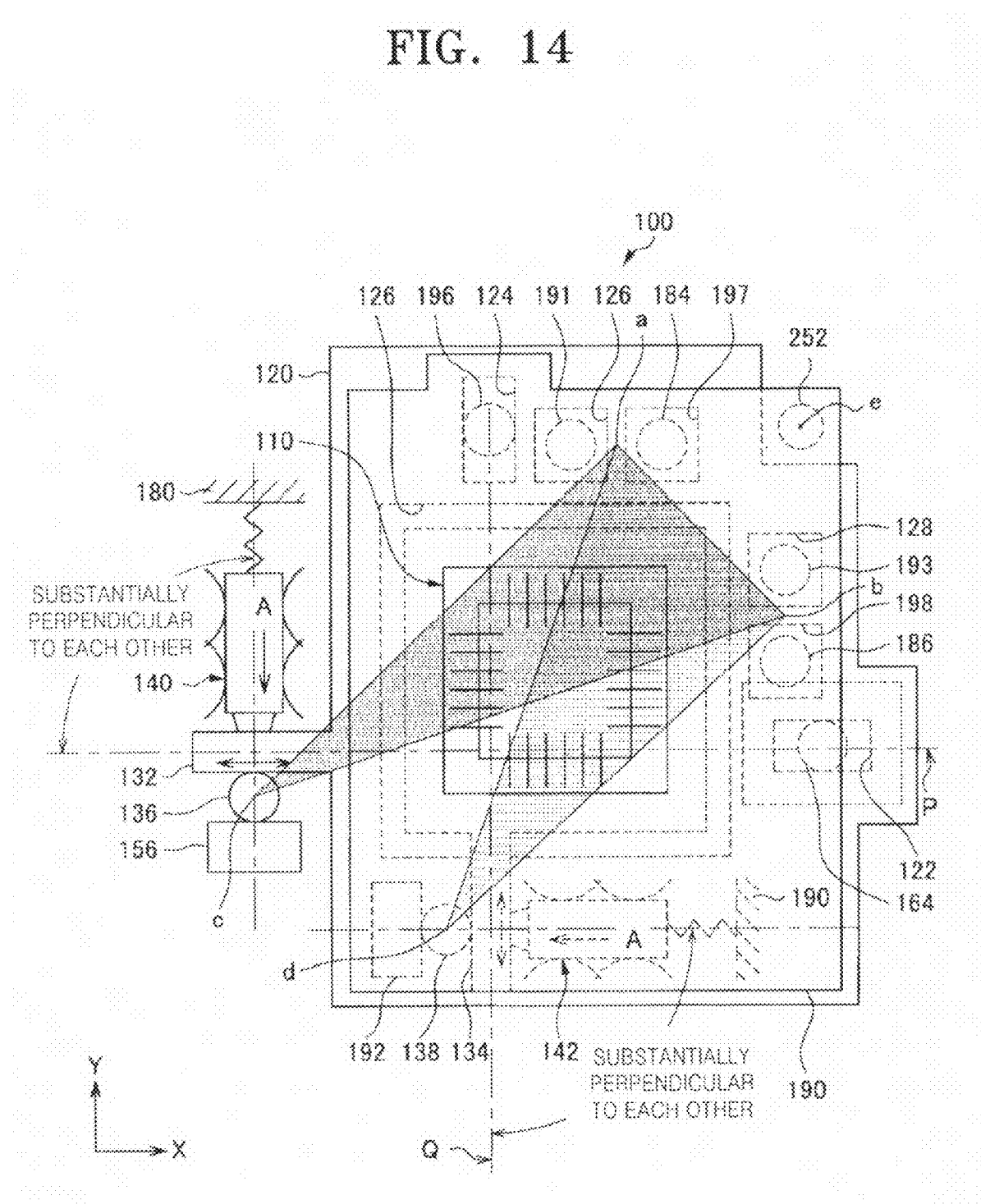
FIG. 14 is a schematic diagram of the image shake correction apparatus of FIG. 3.

In addition, referring to FIG. 14, a structure for preventing the slider 120 and the CCD base 190 from shaking in the Z direction that is perpendicular to the X and Y-axis directions will be described. FIG. 14 is a cross-sectional view of the image shake correction apparatus according to an exemplary embodiment. In addition, in the image shake correction apparatus 100 of FIG. 14, the slider 120 is installed on the base plate 180 and the CCD base 190 is installed on the slider 120, unlike the image shake correction apparatus shown in FIGS. 3 through 13; however, they have basically the same functions, and thus, a detailed description of the structure is omitted.

In the image shake correction apparatus 100 of FIG. 14, the ball bearing 191 is installed between the CCD base 190 and the slider 120, and the ball bearing 184 is installed between the slider 120 and the base plate 180. In addition, the ball bearing 193 is installed between the CCD base 190 and the slider 120, and the ball bearing 186 is installed between the slider 120 and the base plate 180. The CCD base 190 is pulled by a magnet 252 toward the base plate 180.

As shown in FIG. 14, a point (a) between the ball bearings 191 and 184 is assumed as a representative point, and a point (b) between the ball bearings 193 and 186 is assumed as a representative point. In addition, the ball bearing 136 inserted between the V-shaped groove portions 133 and 151 formed on the protrusion portion 132 and the support portion 156 is a point (c), the ball bearing 138 inserted between the groove portions formed on the protrusion portion 134 and the support portion 192 is a point (d), and the magnet 252 pulling the CCD base 190 toward the base plate 180 is a point (e).

The ball bearings 191, 184, 193, and 186 are arranged so that a triangle connecting the points (a), (b), and (c) and a triangle connecting the points (a), (b), and (d) overlap with an image pickup device assembly 110. Also, the magnet 252 is disposed so that a line connecting the points (c) and (e) can pass through the triangle (abc) and a line connecting the points (d) and (e) can pass through the triangle (abd).

Through the above structure, the shaking of the slider 120 and the CCD base 190 on the points (a) and (b) can be prevented by installing a pulling unit, for example, the magnet 252 and the metal plate 182, only on the point (e). In addition, the attraction force of the pulling unit is supported by the spherical ball bearings 191, 184, 193, and 186, and thus, the friction force generated due to the attraction force is transferred to the ball bearings, and the driving force of the piezoelectric actuator assemblies 140 and 142 can be changed into forces for moving the slider 120 and the CCD base 190.

Operations of the image shake correction apparatus 100 according to exemplary embodiments of the present invention will be described as follows. When the image shake correction apparatus detects vibrations from outside, the extension mode and the curvature mode are generated by the piezoelectric device 144 of FIG. 8, and the sliding portion 143 starts an elliptic movement due to a resonance from the two modes. In addition, the elliptic movement of the sliding portion 143 is transferred to the protrusion portions 132 and 134 of the slider 120. When the elliptic movement of the sliding portion 143 is transferred to the protrusion portion 132, the slider 120 drives in the X-axis direction of FIG. 4. In addition, when the elliptic movement of the sliding portion 143 is transferred to the protrusion portion 134, the CCD base 190 drives in the Y-axis direction of FIG. 4.

When the slider 120 drives in the X-axis direction, the slider 120 and the CCD base 190 move in the X-axis direction together. In addition, the image pickup device assembly 110 including the CCD image sensor 112 mounted on the CCD base 190 and the piezoelectric actuator assembly 142 are moved in the X-axis direction with the slider 120. Meanwhile, when the CCD base 190 drives in the Y-axis direction, the CCD base 190 only moves in the Y-axis direction.

When the slider 120 moves in the X-axis direction, the slider 120 moves along the guide line P, and when the CCD base 190 moves in the Y-axis direction, the CCD base 190 moves along the guide line Q. According to exemplary embodiments, the guide lines P and Q are adjacent to the centers of the slider 120 and the CCD base 190. Therefore, rotation moments of the slider 120 and the CCD base 190 can be reduced. Consequently, friction loss or vibrations of the elements can be prevented when the image shake correction apparatus 100 operates.

The movements of the slider 120 and the CCD base 190 in the Z direction that is perpendicular to the X and Y-axis directions are prevented by the magnet 152, the metal plate 182, the V-shaped grooves of the protrusion portions 132 and 134 on the slider 120, and the ball bearings 191, 184, 193, and 186. In addition, the driving forces can be changed by the ball bearings 191, 184, 193, and 186 so that the slider 120 and the CCD base 190 can be efficiently moved in the X and Y-axis directions.

The movement of the CCD base 190 in the X and Y-axis directions is detected by the position detection sensor installed on the sensor holder 150, and detection signals are transferred to the circuit of the photographing apparatus to perform the servo-control when the shake correction is controlled. According to the structure of the image shake correction apparatus 100 of the exemplary embodiments, a disturbance caused by unnecessary rotation moments can be reduced or prevented, and thus, properties of the servo-control for the shake correction can be improved.

Figure 15:
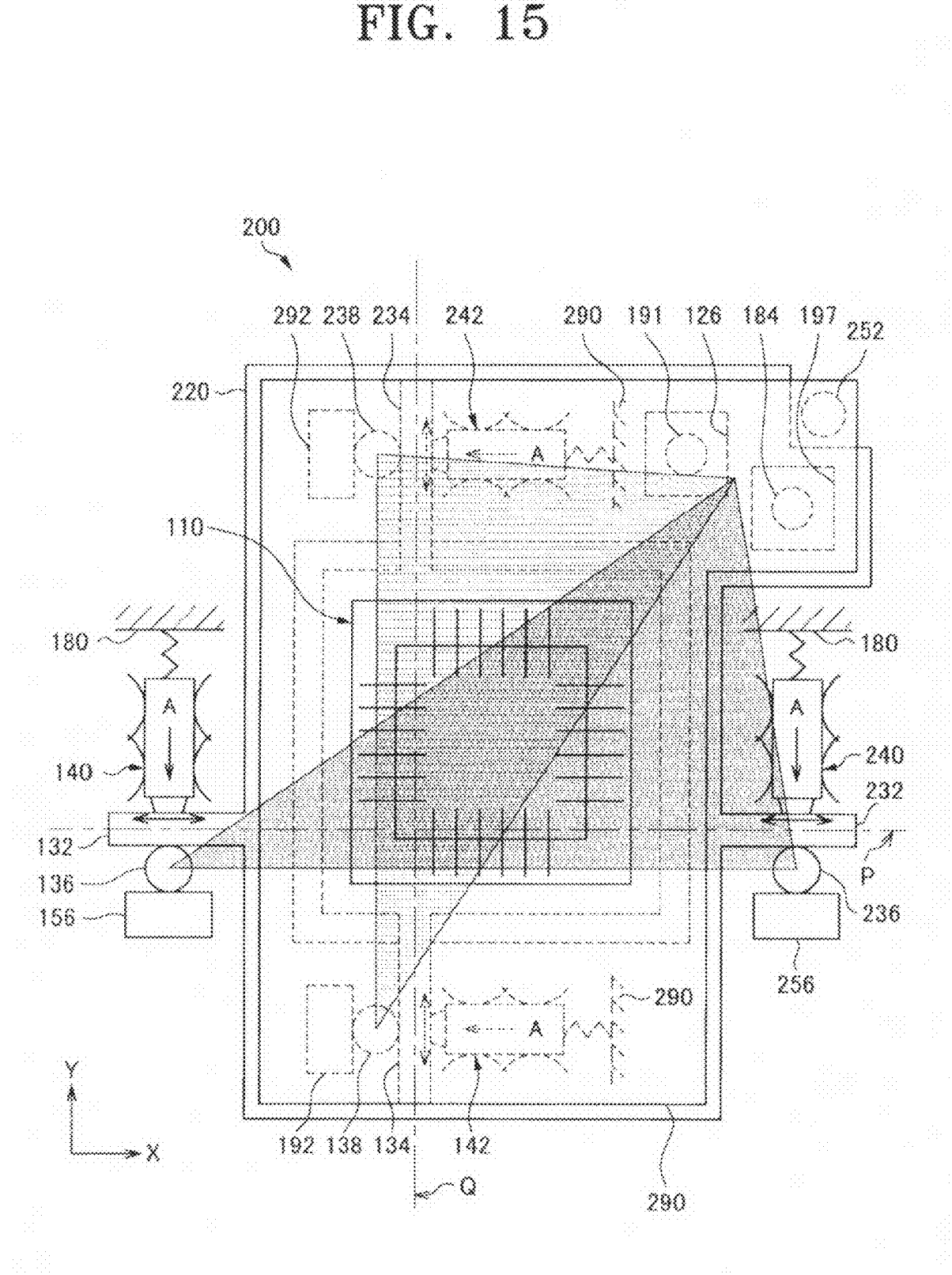
FIG. 15 is a schematic diagram of an image shake correction apparatus according to another embodiment of the present invention.

Next, an image shake correction apparatus according to another exemplary embodiment of the present invention will be described. FIG. 15 is a plan view of the image shake correction apparatus 200 according to the exemplary embodiment. Like reference numerals denote the same elements as in the above embodiment.

The image shake correction apparatus 200 of the exemplary embodiment includes a slider 220 disposed on a base plate 180, a CCD base 290 formed on the slider 220, and piezoelectric actuator assemblies 142 and 242 installed on the CCD base 290. Protrusion portions 132 and 232 protrude form the slider 220, and protrusion portions 134 and 234 protrude from a surface of the slider 220 facing the CCD base 290.

In addition, the protrusion portions 132 and 232 are installed so that a virtual guide line P connecting the protrusion portions 132 and 232 to each other can be parallel with the X-axis direction and extends through an image pickup device assembly 110. Also, the protrusion portions 134 and 234 are installed so that a virtual guide line Q connecting the protrusion portions 134 and 234 to each other are parallel with the Y-axis direction and extends through the image pickup device assembly 110.

The image shake correction apparatus 200 of the exemplary embodiment does not include the guide portion such as the elongated groove 122 in the image shake correction apparatus 100 according to the above embodiment, but includes the piezoelectric actuator assemblies 240 and 242. Two piezoelectric actuator assemblies 140 and 240 are installed with respect to the guide line P, and two piezoelectric actuator assemblies 142 and 242 are installed with respect to the guide line Q. According to the above structure, even if an area and a weight of the image pickup device assembly 110 are great, it can be driven by the four piezoelectric actuator assemblies 140, 240, 142, and 242.

In addition, the protrusion portions 232 and 234 and support portions 256 and 292 also include V-shaped grooves facing each other, like in the protrusion portions 132 and 134 and the support portions 156 and 192. In addition, ball bearings 236 and 238 are disposed between the grooves. Therefore, the image shake correction apparatus 200 does not move in the Z direction that is perpendicular to the X and Y-axis directions on the drawings, loss of the driving forces of the piezoelectric actuator assemblies 140, 142, 240, and 242 can be reduced, and a suspending position of the CCD image sensor 112 can be accurately detected.

In addition, since the piezoelectric actuator assemblies 140, 142, 240, and 242 are installed on both ends of the guide lines P and Q, the movement of the apparatus in the Z direction can be prevented by disposing the ball bearing 191 between the base plate 180 and the slider 220 and disposing the ball bearing 184 between the slider 220 and the CCD base 290. In addition, the ball bearings 191 and 184 can be disposed so that a point between the ball bearings 191 and 184 can be a vertex of a triangle that has a line connecting the ball bearings 136 and 236 as a side, a point between the ball bearings 191 and 184 can be a vertex of a triangle that has a line connecting the ball bearings 138 and 238 as a side, and the two triangles can overlap with the image pickup device assembly 110. According to the exemplary embodiment, the number of elements can be smaller than in the above embodiment.

While the present invention has been particularly shown and described with reference to exemplary embodiments thereof, it will be understood by those of ordinary skill in the art that various changes in form and details may be made therein without departing from the spirit and scope of the present invention as defined by the following claims.

Figure 16:
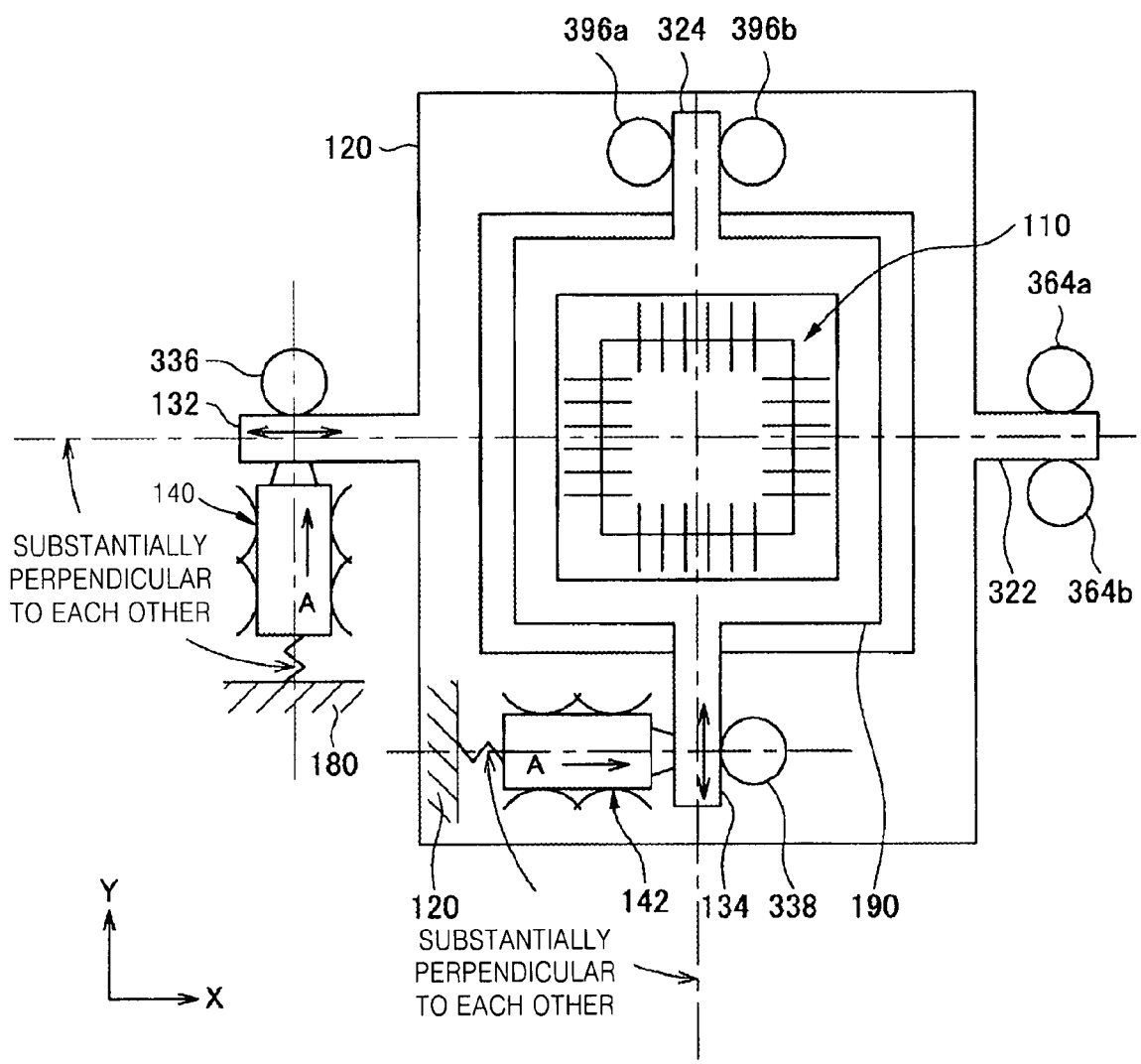
FIG. 16 is a schematic diagram of a modified example of the image shake correction apparatus of FIG. 3.

For example, the guide portion includes the elongated groove and the ball bearing in the previous exemplary embodiments; however, instead of them, the protrusion portions 322 and 324 and protrusion maintaining units 364a, 364b, 396a, and 396b interposing the protrusion portions 322 and 324 therebetween can be formed as shown in FIG. 16. In addition, the protrusion maintaining units 364a, 364b, 396a, and 396b can be circular-shaped fixed members, or can be rotation members rotating in accordance with the movement of the slider 120 or the CCD base 190.

In addition, in the exemplary embodiments, the support portions 156 and 192 that resist the elastic biasing forces caused by the elastic bias portions of the piezoelectric actuator assemblies 140 and 142 and restrict the slider 120 or the CCD base 190 from moving toward the elastically biased direction, and the ball bearings 136 and 138 are disposed between the slider 120 or the CCD base 190 and the support portions 156 and 192; however, as shown in FIG. 16, sustaining portions 336 and 338 can resist the elastic biasing force and prevent the slider 120 or the CCD base 190 from moving in the elastically biased direction.

In addition, in the previous exemplary embodiments, end portions of the piezoelectric actuator assemblies 140 and 142 in the length direction are separated from each other, however, as shown in FIG. 16, end portions of driving force generators in length directions thereof can be adjacent to each other. Through this structure, the entire size of the image shake correction apparatus can be reduced, and electric wires of the two piezoelectric actuator assemblies 140 and 142 can be collected together.

Figure 17:
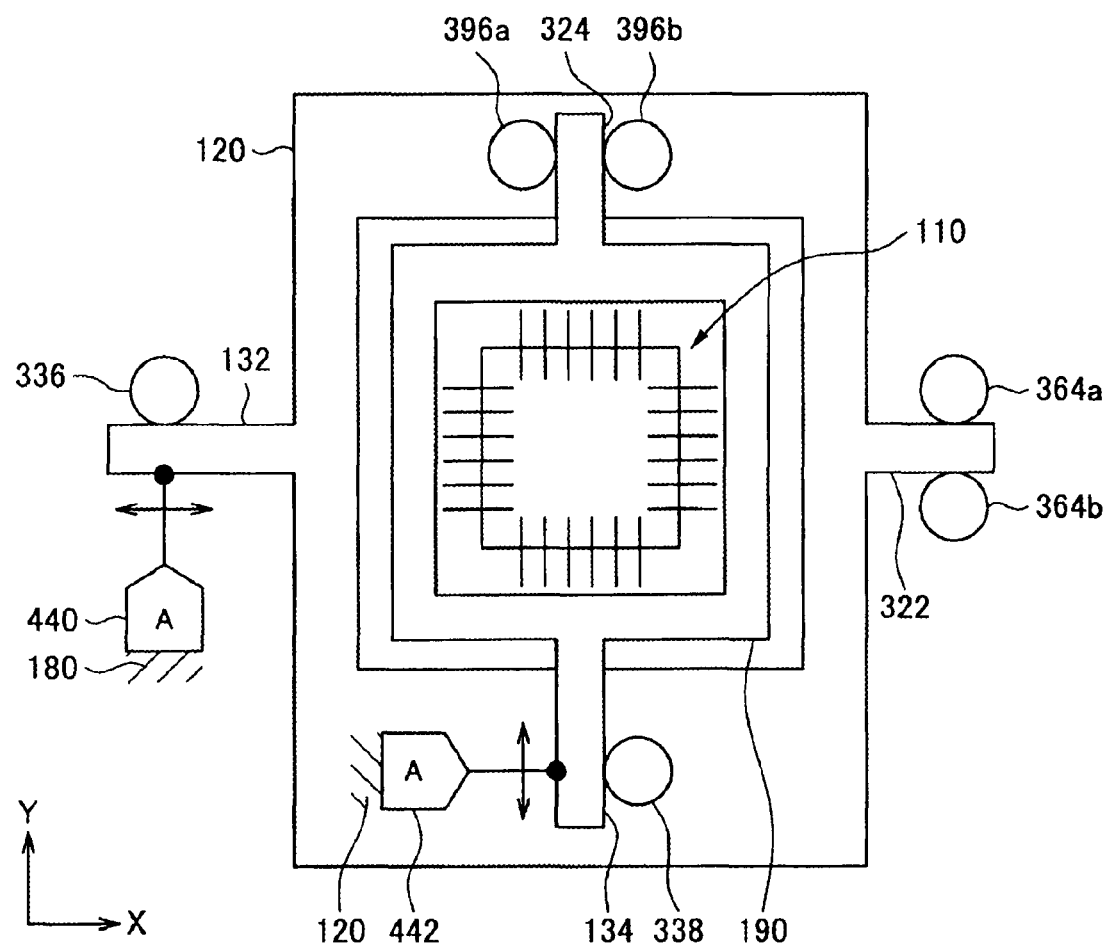
FIG. 17 is a schematic diagram of another modified example of the image shake correction apparatus of FIG. 3.

In addition, the piezoelectric actuator assemblies 140 and 142 including piezoelectric devices are used as the driving force generators in the previous exemplary embodiments; however, as shown in FIG. 17, driving force generators 440 and 442 that can change the moving force of actuators into driving force for moving the slider 120 or the CCD base 190 can be used.

Figure 18:
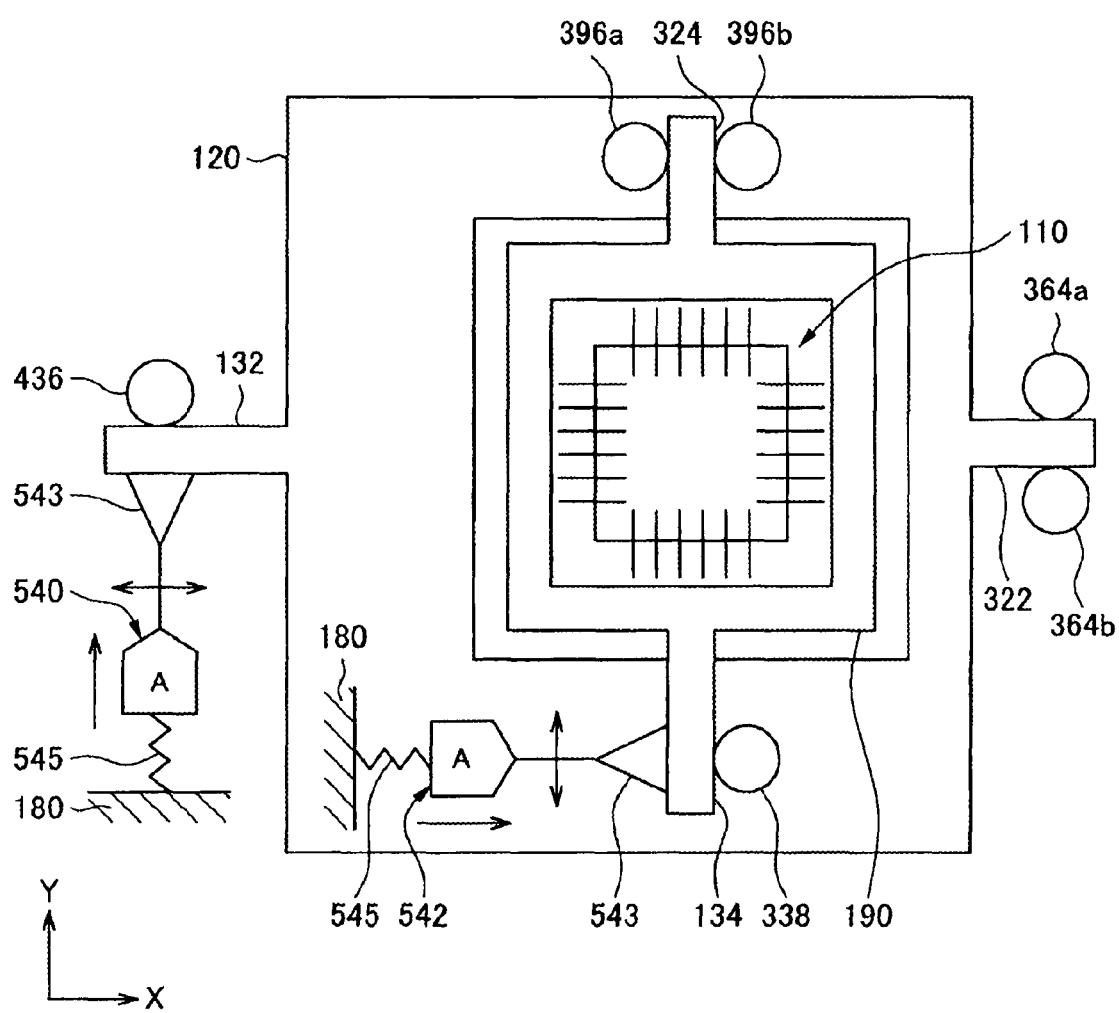
FIG. 18 is a schematic diagram of still another modified example of the image shake correction apparatus of FIG. 3.

In addition, as shown in FIG. 18, driving force generators 540 and 542 can include a contact portion 543 and an elastic biasing portion 545. Movements of the driving force generators 540 and 542 are changed into the driving force of the slider 120 or the CCD base 190, and thus, the driving force generators 540 and 542 are pressure-welded by the elastic bias portion 545. Also, by the pressure welding operation, the driving force generators 540 and 542 always contact the slider 120 or the CCD base 190 through the contact portion 543 when the electric power is turned off, and thus, the movement of the slider 120 or the CCD base 190 can be suspended.

Figure 19:
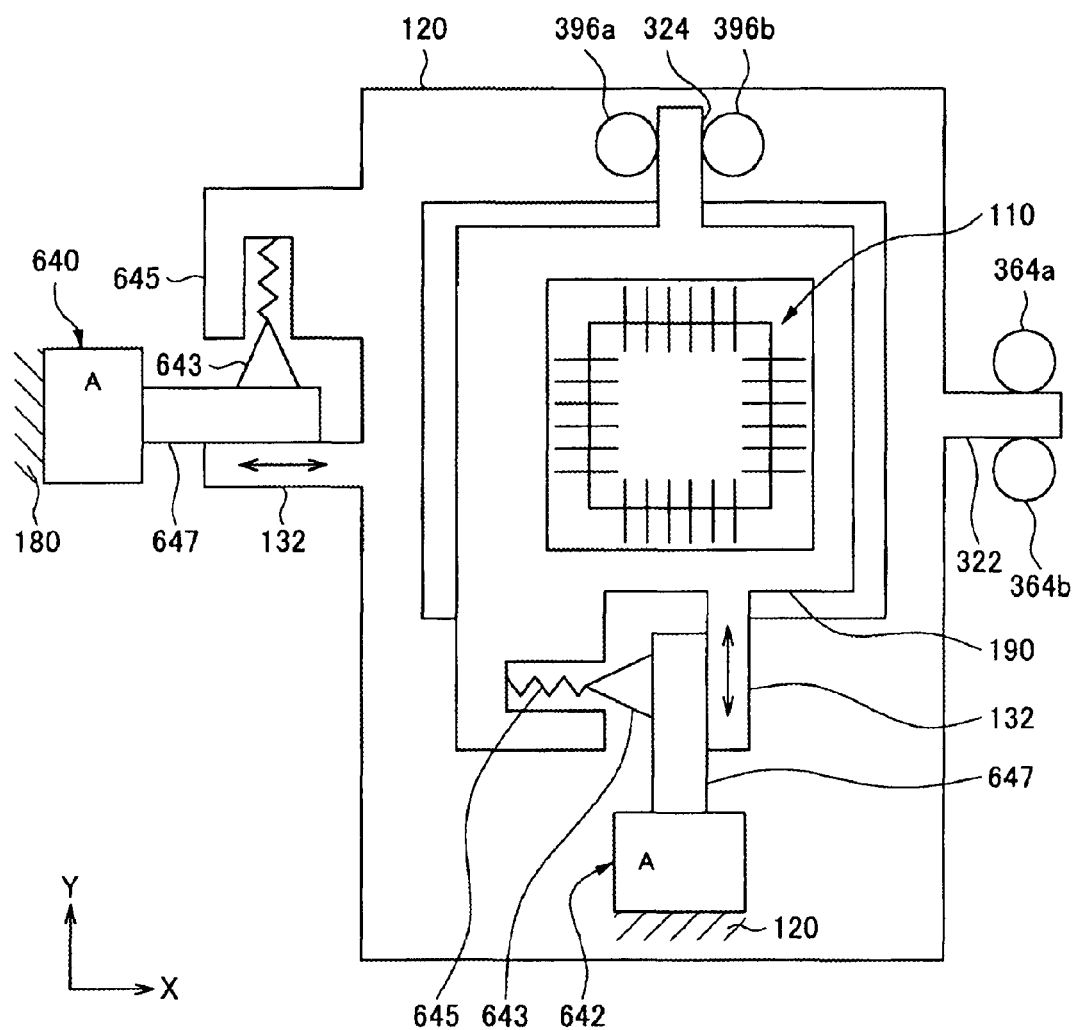
FIG. 19 is a schematic diagram of still another modified example of the image shake correction apparatus of FIG. 3.

Also, according to the previous exemplary embodiments, the piezoelectric actuator assemblies 140 and 142 are the driving force generators, and the piezoelectric actuator assemblies 140 and 142 transmit the driving force in a direction perpendicular to the length directions of the piezoelectric actuator assemblies 140 and 142; however, the present invention is not limited thereto. Driving force generators 640 and 642 can include a contact portion 643, an elastic bias portion 645, and a sliding portion 647 as shown in FIG. 19. The sliding portion 647 of the driving force generators 640 and 642 moves in length directions of the driving force generators 640 and 642. In addition, the sliding 647 is elastically biased to the protrusion portion 132 through the contact portion 643 by the elastic bias portion 645, and thus, the driving force is transmitted to the slider 120 or the CCD base 190. Here, the length of the driving force generators 640 and 642 are parallel to the transmission direction of the driving force.

In addition, although the image pickup device mounted on the image pickup device stage of the image shake correction apparatus is described as being CCD image sensor, the present invention is not limited thereto, and other image pickup devices such as a complementary metal-oxide-semiconductor (CMOS) image sensor can be used.

What is claimed is:

1. An image shake correction apparatus comprising:
   an image pickup device for changing a light irradiated on a photographing surface into electric signals;
   an image pickup device stage for supporting the image pickup device, and moving the image pickup device on a surface parallel to the photographing surface;
   a driving force generator for driving the image pickup device stage;
   a guide portion for guiding a moving direction of the image pickup device stage,
   wherein a virtual line connecting: a) a contact portion, to which the driving force generator can apply a driving force, and b) the guide portion, extends across two parallel edges of the photographing surface of the image pickup device, the contact portion and the guide portion being arranged on opposite sides of the photographing surface; and
   an elastic bias portion that elastically biases the driving force generator so as to press the driving force generator to make contact with an operating portion of the image pickup device stage,
   wherein the driving force of the driving force generator is transferred to the operating portion of the image pickup device stage using a frictional force so as to move the image pickup device stage on a surface parallel to the photographing surface.

2. An image shake correction apparatus comprising:
   an image pickup device for changing a light irradiated on a photographing surface into electric signals;
   an image pickup device stage for supporting the image pickup device, and moving the image pickup device on a surface parallel to the photographing surface;
   a driving force generator for driving the image pickup device stage;
   a guide portion for guiding a moving direction of the image pickup device stage, wherein a virtual line connecting: a) a contact portion, to which the driving force generator can apply a driving force, and b) the guide portion, extends across two parallel edges of the photographing surface of the image pickup device, the contact portion and the guide portion being arranged on opposite sides of the photographing surface;
   wherein
   the image pickup device stage comprises
      a first stage including first and second protrusions, the first stage moving the image pickup device in a first direction, and
      a second stage including first and second protrusions, the second stage moving the image pickup device in a second direction that is perpendicular to the first direction, the driving force generator includes
a first driving force generator for driving the first stage in the first direction, and
a second driving force generator integrally mounted with the first stage for moving the second stage in the second direction, wherein
the first driving force generator and the second driving force generator are disposed in a same quadrant in coordinates of which
a first axis extends the first or second protrusions of the first stage in parallel to the first direction and
a second axis extends the first or second protrusions of the second stage in parallel to the second direction, and
the first and second axes are disposed in perpendicular relation to each other on the photographing surface of the image pickup device.

3. The apparatus of claim 2, wherein
the image pickup device stage comprises
a first stage including first and second protrusions, the first stage moving the image pickup device in a first direction, and
a second stage including first and second protrusion, the second stage moving the image pickup device in a second direction that is perpendicular to the first direction,
the driving force generator includes a first driving force generator for driving the first stage in the first direction, and a second driving force generator integrally mounted with the first stage for moving the second stage in the second direction, wherein
the first driving force generator and the second driving force generator are disposed in a same quadrant in coordinates of which
a first axis extends the first or second protrusions of the first stage in parallel to the first direction and
a second axis extends the first or second protrusions of the second stage in parallel to the second direction, and
the first and second axes are disposed in perpendicular relation to each other on the photographing surface of the image pickup device.

4. The apparatus of claim 2, wherein the driving force generator is disposed so that a length of the driving force generator is substantially perpendicular to the moving direction of the image pickup device stage and parallel to the photographing surface of the image pickup device.

5. The apparatus of claim 4, further comprising
a second driving force generator, and
a stage maintaining portion having a first ball bearing, which is interposed between a base plate fixed on a main body of the apparatus and the image pickup device stage, and maintaining steady the image pickup device stage so as to move the image pickup device stage on a surface parallel to the photographing surface, wherein
each driving force generator is disposed on a different side of the image pickup device so as to drive the image pickup device in the moving direction, and
a virtual triangle formed by connecting an operating portion of each of the driving force generators and the first ball bearing covers at least a part of the photographing surface.

6. The apparatus of claim 4, wherein
the image pickup device stage comprises
a first stage including first and second protrusions, the first stage moving the image pickup device in a first direction, and
a second stage including first and second protrusions, the second stage moving the image pickup device in a second direction that is perpendicular to the first direction,
the driving force generator includes
a first driving force generator for driving the first stage in the first direction, and
a second driving force generator integrally mounted with the first stage for moving the second stage in the second direction, wherein
the first driving force generator and the second driving force generator are disposed in a same quadrant in coordinates of which
a first axis extends the first or second protrusions of the first stage in parallel to the first direction and
a second axis extends the first or second protrusions of the second stage in parallel to the second direction, and
the first and second axes are disposed in perpendicular relation to each other on the photographing surface of the image pickup device.

7. The apparatus of claim 2, further comprising:
a fixing member fixed on a main body of the apparatus and to which the elastic biasing force is applied from the elastic bias portion through the operating portion of the image pickup device stage; and
a first ball bearing disposed between the fixing member and the image pickup device stage;
wherein grooves having V-shaped cross sections are formed in opposing surfaces of the fixing member and the image pickup device stage, respectively, such that the grooves face each other and the first ball bearing is disposed between the grooves.

8. The apparatus of claim 7, further comprising
a second driving force generator, and
a stage maintaining portion having a second ball bearing, which is interposed between a base plate fixed on a main body of the apparatus and the image pickup device stage, and maintaining steady the image pickup device stage so as to move the image pickup device stage on a surface parallel to the photographing surface, wherein
each driving force generator is disposed on a different side of the image pickup device so as to drive the image pickup device in the moving direction, and
a virtual triangle formed by connecting an operating portion of each of the driving force generators and the second ball bearing covers at least a part of the photographing surface.

9. The apparatus of claim 7, wherein
the image pickup device stage comprises
a first stage including first and second protrusions, the first stage moving the image pickup device in a first direction, and
a second stage including first and second protrusions, the second stage moving the image pickup device in a second direction that is perpendicular to the first direction,
the driving force generator includes
a first driving force generator for driving the first stage in the first direction, and a second driving force generator integrally mounted with the first stage for moving the second stage in the second direction, wherein the first driving force generator and the second driving force generator are disposed in a same quadrant in coordinates of which a first axis extends the first or second protrusions of the first stage in parallel to the first direction and a second axis extends the first or second protrusions of the second stage in parallel to the second direction, and the first and second axes are disposed in perpendicular relation to each other on the photographing surface of the image pickup device.

10. An image shake correction apparatus comprising:

an image pickup device for changing a light irradiated on a photographing surface into electric signals;

an image pickup device stage for supporting the image pickup device, and moving the image pickup device on a surface parallel to the photographing surface;

a driving force generator for driving the image pickup device stage;

a guide portion for guiding a moving direction of the image pickup device stage, wherein a virtual line connecting: a) a contact portion, to which the driving force generator can apply a driving force, and b) the guide portion, extends across two parallel edges of the photographing surface of the image pickup device, the contact portion and the guide portion being arranged on opposite sides of the photographing surface;

a second driving force generator, and a stage maintaining portion having a first ball bearing, which is interposed between a base plate fixed on a main body of the apparatus and the image pickup device stage, and maintaining steady the image pickup device stage so as to move the image pickup device stage on a surface parallel to the photographing surface, wherein each driving force generator is disposed on a different side of the image pickup device so as to drive the image pickup device in the moving direction, and a virtual triangle formed by connecting an operating portion of each of the driving force generators and the first ball bearing covers at least a part of the photographing surface.

11. The apparatus of claim 2, further comprising a second driving force generator, and a stage maintaining portion having a first ball bearing, which is interposed between a base plate fixed on a main body of the apparatus and the image pickup device stage, and maintaining steady the image pickup device stage so as to move the image pickup device stage on a surface parallel to the photographing surface, wherein each driving force generator is disposed on a different side of the image pickup device so as to drive the image pickup device in the moving direction, and a virtual triangle formed by connecting an operating portion of each of the driving force generators and the first ball bearing covers at least a part of the photographing surface.

12. An apparatus for correcting image shake in a camera, the camera including an image pickup device for changing a light irradiated on a photographing surface into electric signals, the apparatus comprising:

an image pickup device stage adapted to support the image pickup device, the image pickup device stage moving the image pickup device on a surface parallel to the photographing surface;

a driving force generator for applying a driving force to a driving portion of the image pickup device stage;

a guide portion for guiding movement of the image pickup device stage, the guide portion disposed on a first side of the image pickup device stage;

a fixing member to which an elastic biasing force is applied through the driving portion, the fixing member disposed on a main body of the apparatus and adjacent to a second side of the image pickup device stage, the second side opposite to the first side of the image pickup device stage; and a first ball bearing disposed between the fixing member and the driving portion, wherein a virtual line connects: a) a contact portion at which the driving force generator contacts the driving portion of the image pickup device stage; and b) the guide portion, and the virtual line, extends across two parallel edges of the photographing surface of the image pickup device.

13. The apparatus of claim 12, further comprising:

an elastic bias portion for pressing the driving force generator into contact with the driving portion of the image pickup device stage, wherein the driving force of the driving force generator is transferred to the driving portion of the image pickup device stage using a frictional force so as to move the image pickup device stage on a surface parallel to the photographing surface.

14. A method of correcting image shake comprising:

changing a light irradiated on a photographing surface into electric signals with an image pickup device, the image pickup device being supported on an image pickup device stage;

moving the image pickup device on a surface parallel to the photographing surface;

driving the image pickup device stage with a driving force generator;

guiding a moving direction of the image pickup device stage with a guide portion, wherein a virtual line connecting: a) a contact portion, to which the driving force generator can apply a driving force, and b) the guide portion, extends across two parallel edges of the photographing surface of the image pickup device, the contact portion and the guide portion being arranged on opposite sides of the photographing surface;

elastically biasing the driving force generator so as to press the driving force generator to make contact with an operating portion of the image pickup device stage; and frictionally transferring the driving force of the driving force generator to the image pickup device stage so as to move the image pickup device stage on a surface parallel to the photographing surface.

15. The method of claim 14, wherein the moving direction of the image pickup device stage is substantially perpendicular to a length of the driving force generator and parallel to the photographing surface of the image pickup device.

16. The method of claim 14, further comprising:

applying an elastic biasing force through the operating portion of the image pickup device stage to a fixing member fixed on a main body of the apparatus;

preventing displacement perpendicular to the moving direction of the image pickup device with a first ball bearing disposed in V-shaped cross section grooves on the fixing member and the image pickup device stage.

17. A method of correcting image shake comprising:
changing a light irradiated on a photographing surface into electric signals with an image pickup device, the image pickup device being supported on an image pickup device stage;
moving the image pickup device on a surface parallel to the photographing surface;
driving the image pickup device stage with a driving force generator;
guiding a moving direction of the image pickup device stage with a guide portion,
wherein a virtual line connecting: a) a contact portion, to which the driving force generator can apply a driving force, and b) the guide portion, extends across two parallel edges of the photographing surface of the image pickup device, the contact portion and the guide portion being arranged on opposite sides of the photographing surface;
wherein the driving force generator is a first driving force generator and a second driving force generator, the method further comprising:
maintaining steady with a stage maintaining portion the image pickup device stage so as to move the image pickup device stage on a surface parallel to the photographing surface, the stage maintaining portion having a first ball bearing disposed between a base plate fixed on a main body of the apparatus and the image pickup device stage;
driving the image pickup device in the moving direction with the driving force generators, each generator disposed on a different side of the image pickup device,
wherein further a virtual triangle formed by connecting an operating portion of each of the driving force generators and the first ball bearing covers at least a part of the photographing surface.

18. A method of correcting image shake comprising:
changing a light irradiated on a photographing surface into electric signals with an image pickup device, the image pickup device being supported on an image pickup device stage;
moving the image pickup device on a surface parallel to the photographing surface;
driving the image pickup device stage with a driving force generator;
guiding a moving direction of the image pickup device stage with a guide portion,
wherein a virtual line connecting: a) a contact portion, to which the driving force generator can apply a driving force, and b) the guide portion, extends across two parallel edges of the photographing surface of the image pickup device, the contact portion and the guide portion being arranged on opposite sides of the photographing surface;
driving with a first driving force generator a first stage of the image pickup device stage in a first direction, the first stage including first and second protrusions; and
driving with a second driving force generator a second stage of the image pickup device stage in a second direction, the second stage including first and second protrusions, the second driving force generator being integrally mounted with the first stage for moving the second stage in the second direction,
wherein the first driving force generator and the second driving force generator are disposed in a same quadrant in coordinates of which a first axis extends the first or second protrusions of the first stage in parallel to the first direction and a second axis extends the first or second protrusions of the second stage in parallel to the second direction, and the first and second axes are disposed in perpendicular relation to each other on the photographing surface of the image pickup device.

19. An image shake correction apparatus comprising:
an image pickup device for changing a light irradiated on a photographing surface into electric signals;
an image pickup device stage for supporting the image pickup device, and moving the image pickup device on a surface parallel to the photographing surface;
a driving force generator for driving the image pickup device stage;
a guide portion for guiding a moving direction of the image pickup device stage;
an elastic bias portion that elastically biases the driving force generator so as to press the driving force generator to make contact with an operating portion of the image pickup device stage;
a fixing member fixed on a main body of the apparatus and to which the elastic biasing force is applied from the elastic bias portion through the operating portion of the image pickup device stage; and
a first ball bearing disposed between the fixing member and the image pickup device stage;
wherein: grooves having V-shaped cross sections are formed in opposing surfaces of the fixing member and the image pickup device stage, respectively, the grooves face each other and the first ball bearing is disposed between the grooves;
wherein the driving force of the driving force generator is transferred to the operating portion of the image pickup device stage using a frictional force so as to move the image pickup device stage on a surface parallel to the photographing surface; and
wherein a virtual line connecting a portion, to which the driving force generator can apply a driving force, to the guide portion, extends on the photographing surface of the image pickup device.

20. The apparatus of claim 19, further comprising
a second driving force generator, and
a stage maintaining portion having a second ball bearing, which is interposed between a base plate fixed on a main body of the apparatus and the image pickup device stage, and maintaining steady the image pickup device stage so as to move the image pickup device stage on a surface parallel to the photographing surface,
wherein
each driving force generator is disposed on a different side of the image pickup device so as to drive the image pickup device in the moving direction, and
a virtual triangle formed by connecting an operating portion of each of the driving force generators and the second ball bearing covers at least a part of the photographing surface.

21. The apparatus of claim 19, wherein
the image pickup device stage comprises
a first stage including first and second protrusions, the first stage moving the image pickup device in a first direction, and
a second stage moving the image pickup device in a second direction that is perpendicular to the first direction,
the driving force generator includes
a first driving force generator for driving the first stage in the first direction, and a second driving force generator integrally mounted with the first stage for moving the second stage in the second direction, wherein the first driving force generator and the second driving force generator are disposed in a same quadrant of the image pickup device stage and the first protrusion moves along a first axis parallel to the first direction and the second protrusion moves along a second axis parallel to the second direction, the first and second axes are disposed in perpendicular relation to each other on the photographing surface of the image pickup device.

22. A method of correcting image shake comprising:

changing a light irradiated on a photographing surface into electric signals with an image pickup device, the image pickup device being supported on an image pickup device stage;

moving the image pickup device on a surface parallel to the photographing surface;

driving the image pickup device stage with a driving force generator;

guiding a moving direction of the image pickup device stage with a guide portion;

elastically biasing the driving force generator so as to press the driving force generator to make contact with an operating portion of the image pickup device stage;

frictionally transferring the driving force of the driving force generator to the image pickup device stage so as to move the image pickup device stage on a surface parallel to the photographing surface;

applying an elastic biasing force through the operating portion of the image pickup device stage to a fixing member fixed on a main body of the apparatus; and preventing displacement perpendicular to the moving direction of the image pickup device with a first ball bearing disposed in V-shaped cross section grooves on the fixing member and the image pickup device stage, wherein a virtual line connecting a portion, to which the driving force generator can apply a driving force, to the guide portion, extends on the photographing surface of the image pickup device.

\* \* \* \* \*